United States Patent
Ganesh et al.

(10) Patent No.: US 10,951,514 B2
(45) Date of Patent: Mar. 16, 2021

(54) TRAFFIC DISTRIBUTION APPROACHES IN MULTIPATH TCP WITH MONETARY LINK-COST AWARENESS

(71) Applicant: Cisco Technology, Inc., San Jose, CA (US)

(72) Inventors: Nandini Ganesh, Fremont, CA (US); Sri Gundavelli, San Jose, CA (US); Pradeep Kumar Kathail, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 7 days.

(21) Appl. No.: 16/418,051

(22) Filed: May 21, 2019

(65) Prior Publication Data

US 2020/0374216 A1   Nov. 26, 2020

(51) Int. Cl.
| | |
|---|---|
| *H04L 12/707* | (2013.01) |
| *H04L 29/06* | (2006.01) |
| *H04L 12/803* | (2013.01) |
| *H04L 12/729* | (2013.01) |

(52) U.S. Cl.
CPC ............ *H04L 45/24* (2013.01); *H04L 45/125* (2013.01); *H04L 47/125* (2013.01); *H04L 69/14* (2013.01)

(58) Field of Classification Search
CPC ........ H04L 45/24; H04L 69/14; H04L 47/125
See application file for complete search history.

(56) References Cited

U.S. PATENT DOCUMENTS

| | | | | |
|---|---|---|---|---|
| 2014/0321274 A1* | 10/2014 | Gahm | ..................... | H04L 47/31 370/231 |
| 2014/0362765 A1* | 12/2014 | Biswas | ................... | H04L 45/24 370/328 |
| 2015/0215922 A1* | 7/2015 | Bahk | ........................ | H04L 47/14 370/235 |
| 2018/0213041 A1* | 7/2018 | Biswas | ................... | H04L 45/24 |
| 2019/0158568 A1* | 5/2019 | Han | ....................... | H04W 76/10 |
| 2019/0289477 A1* | 9/2019 | Huang | .................... | H04L 69/14 |
| 2020/0007449 A1* | 1/2020 | Morin | ................... | H04L 47/193 |

OTHER PUBLICATIONS

Request for Comments (RFC) 8041 "Use Cases and Operational Experience with Multipath TCP"; Bonaventure et al.; Jan. 2017 (Year: 2017).*
RFC 6824 "TCP Extensions for Multipath Operation with Multiple Addresses"; Ford et al.; Jan. 2013 (Year: 2013).*

* cited by examiner

*Primary Examiner* — Benjamin H Elliott, IV
(74) *Attorney, Agent, or Firm* — Polsinelli PC

(57) ABSTRACT

Systems, methods, and computer-readable media for controlling data transmission in TCP subflows of a MPTCP connection based on monetary cost. A low cost link and a high cost link of TCP subflows of a MPTCP connection formed between a first MPTCP peer and a second MPTCP peer can be identified. A congestion level on the low cost link can be determined based on feedback from a TCP congestion control mechanism for the MPTCP connection. Further, whether to send a data packet over the low cost link of the high cost link based on the congestion level on the low cost link can be determined. As follows, the data packet can be sent over the low cost link connection if it is determined to send the data packet over the low cost link.

20 Claims, 15 Drawing Sheets

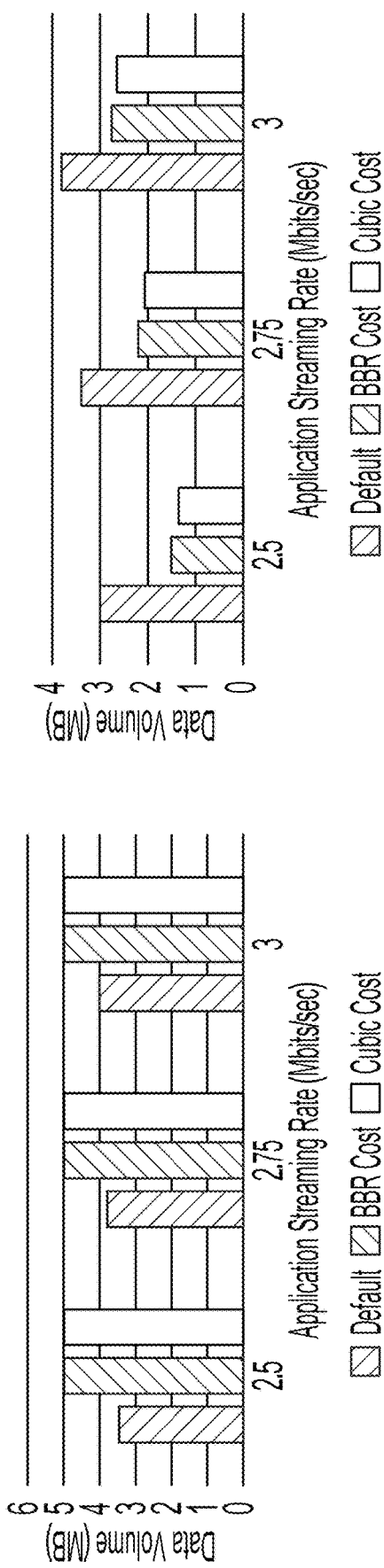
FIG. 11A
FIG. 11B
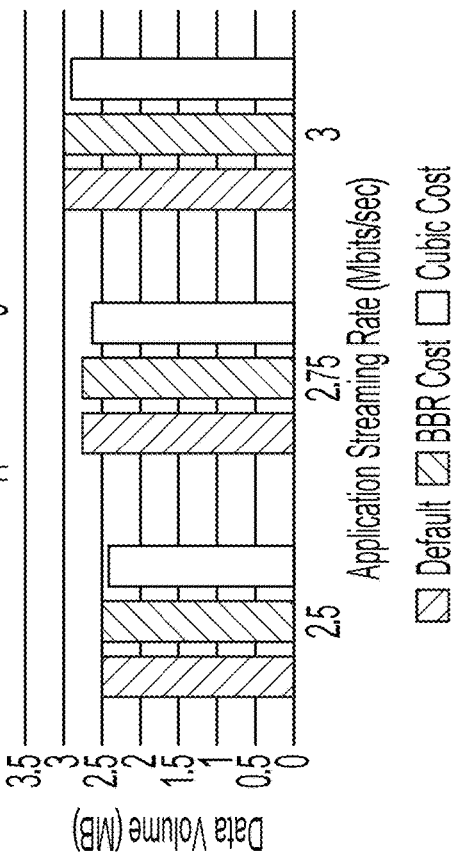
FIG. 11C

TRAFFIC DISTRIBUTION APPROACHES IN MULTIPATH TCP WITH MONETARY LINK-COST AWARENESS

TECHNICAL FIELD

The present technology pertains to controlling data transmission in transmission control protocol (TCP) subflows of a multipath TCP (MPTCP) connection based on monetary cost, and in particular to sending a data packet in either a high cost link or a low cost link of TCP subflows of a MPTCP connection based on a congestion level in the low cost link and a lower cost of the low cost link compared to a cost of the high cost link.

BACKGROUND

MPTCP provides the ability to simultaneously use multiple paths between two TCP peers. Using MPTCP extensions, a TCP application client and an application server, e.g. two MPTCP peers, can establish multiple TCP subflows over different access networks and split the data stream over those paths and links. This essentially offers the key benefits of better user experience in the form of both higher throughput and also increased resiliency to path failures.

Recently, standards bodies, e.g. the Internet Engineering Task Force (IETF), and researchers have analyzed the MPTCP protocol, RFC 6824, thoroughly and greatly improved performance of MPTCP connections established and maintained according to the protocol. One goal of improving the MPTCP protocol has focused on efficient utilization of links/TCP subflows to realize a higher aggregate application throughput.

However, one of the fundamental gaps in the protocol is the lack of awareness on the monetary cost associated with a given link. For example, one of the two access links used to establish MPTCP subflows may be a metered link where a customer pays for every octet of data transmission, e.g. an LTE link. Further, the other link may either be a link with no usage-based cost associated with it, or a link with a flat-rate cost, e.g. WiFi. In turn, consideration of incurring minimal costs to a user while still providing the best user experience in forming an MPTCP connection over such links is lacking in the current MPTCP protocol. Specifically, such consideration is not present in the protocol, at a local peer, a remote peer, or in data distribution techniques for forming MPTCP connections. There therefore exist needs for systems and methods for establishing and maintaining MPTCP connections based on monetary cost. In particular, there exist needs for systems and methods for establishing and maintaining MPTCP connections based on monetary cost while still achieving significant or higher aggregate application throughput to provide a satisfactory user experience.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

Specifically.

FIG. 11A shows a graph of low cost link usage in MPTCP connections operating at different speeds and controlled using different traffic control mechanisms;

FIG. 11B shows a graph of high cost link usage in the MPTCP connections operating at different speeds and controlled using the different traffic control mechanisms;

FIG. 11C shows a graph of throughput in the MPTCP connections operating at different connection speeds and controlled using the different traffic control mechanisms;

DESCRIPTION OF EXAMPLE EMBODIMENTS

Figure 1A:
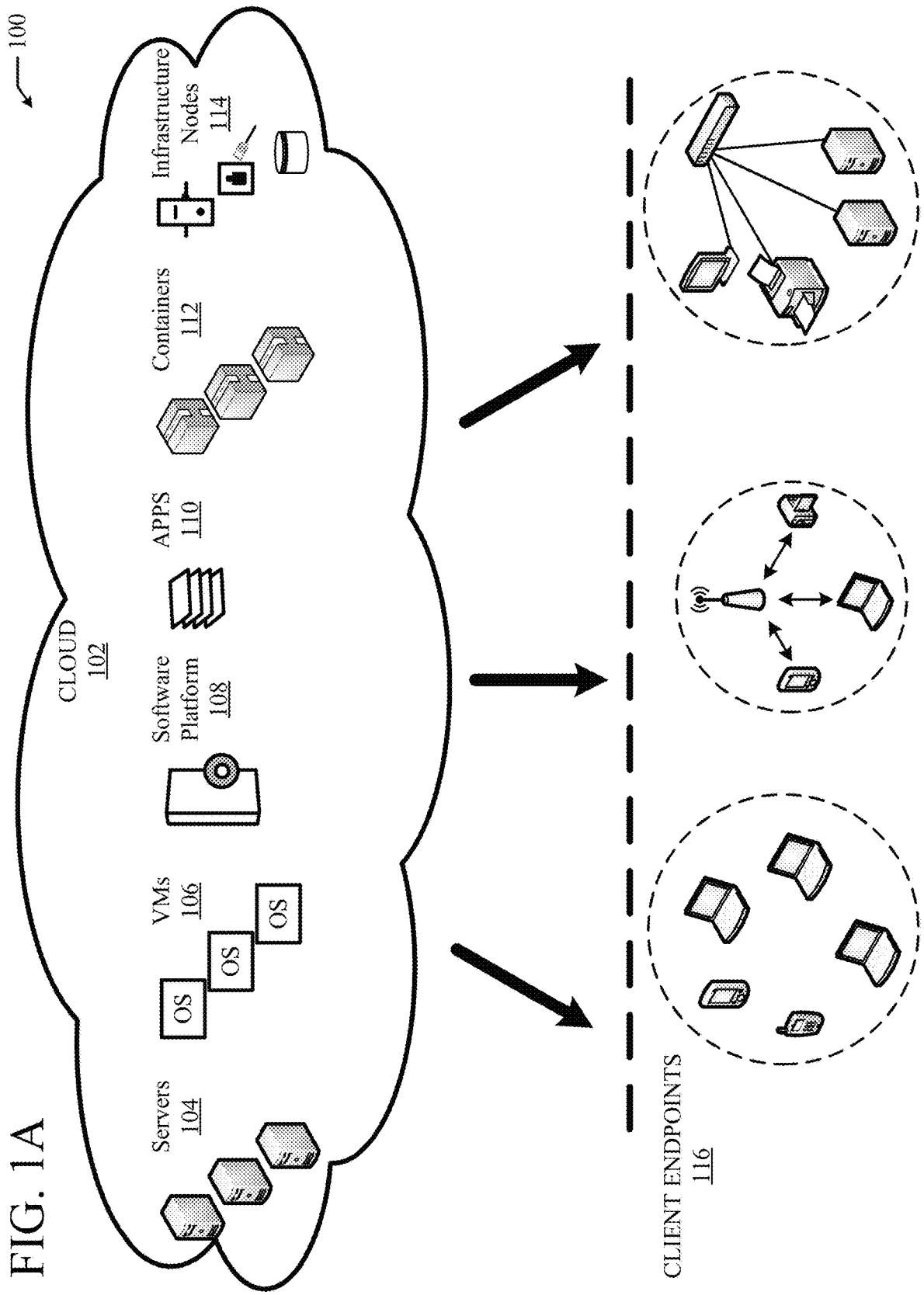
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include identifying a low cost link and a high cost link of TCP subflows of a MPTCP connection formed between a first MPTCP peer and second MPTCP peer. A congestion level on the low cost link can be determined based on feedback from a TCP congestion control mechanism for the MPTCP connection. Further, whether to send a data packet in the MPTCP connection over the low cost link or the high cost link can be determined based on the congestion level on the low cost link and a lower cost of the low cost link compared to a cost of the high cost link. As follows, the data packet can be sent over the low cost link as part of the MPTCP connection if it is determined to send the data packet over the low cost link.

A system can include one or more processors and at least one computer-readable storage medium storing instructions which, when executed by the one or more processors, cause the one or more processors to identify a low cost link and a high cost link of TCP subflows of a MPTCP connection between a first MPTCP peer and a second MPTCP peer. The instructions can cause the one or more processors to also determine a congestion level on the low cost link based on feedback from a TCP congestion control mechanism for the MPTCP connection. Further, the instructions can cause the one or more processors to determine whether to send a data packet in the MPTCP connection over the low cost link or the high cost link based on the congestion level on the low cost link and a lower cost of the low cost link compared to a cost of the high cost link. The instructions can cause the one or more processors to send the data packet over the low cost link as part of the MPTCP connection if it is determined to send the data packet over the low cost link. As follows, the instructions can cause the one or more processors to send the data packet over the high cost link instead of the low cost link if it is determined to send the data packet over the high cost link based on the congestion level on the low cost link and the lower cost of the low cost link compared to the cost of the high cost link.

A non-transitory computer-readable storage medium having stored therein instructions which, when executed by a processor, cause the processor to identify a low cost link and a high cost link of TCP subflows of a MPTCP connection formed between a first MPTCP peer and a second MPTCP peer. The instructions can also cause the processor to determine a congestion level on the low cost link based on feedback from a TCP congestion control mechanism for the MPTCP connection. Further, the instructions can cause the processor to send a data packet over the low cost link as part of the MPTCP connection if it is determined to send the data packet over the low cost link based on the congestion level on the low cost link and a lower cost of the low cost link compared to a cost of the high cost link.

Example Embodiments

The disclosed technology addresses the need in the art for controlling data transmission in TCP subflows of a MPTCP connection based on monetary cost, and in particular the need in the art for sending data packets over a high cost link or a low cost link in a MPTCP connection based on monetary cost while meeting network throughput requirements. The present technology involves system, methods, and computer-readable media for controlling data transmission in TCP subflows of a MPTCP connection based on monetary cost. Additionally, the present technology involves systems, methods, and computer-readable media for sending a data packet in either a high cost link or a low cost link of TCP subflows of a MPTCP connection based on a congestion level in the low cost link and a lower cost of the low cost link compared to a cost of the high cost link.

Figure 12:
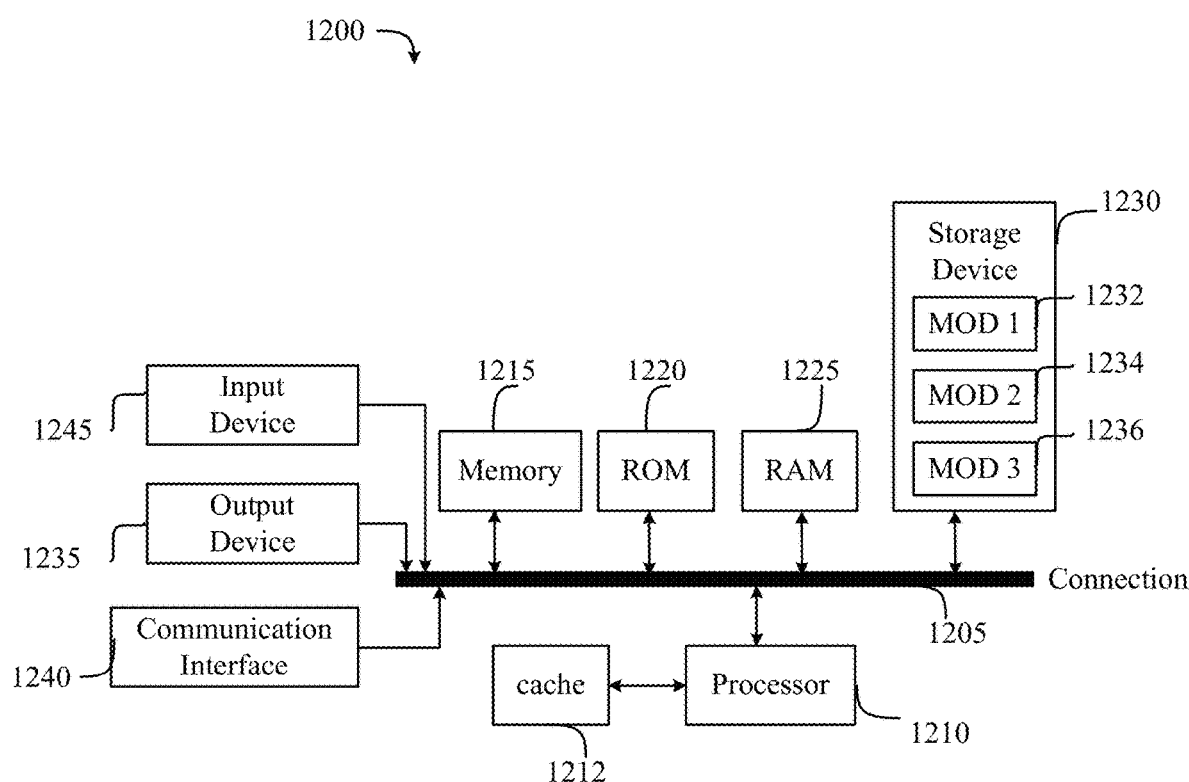
FIG. 12 illustrates an example computing system.
Figure 13:
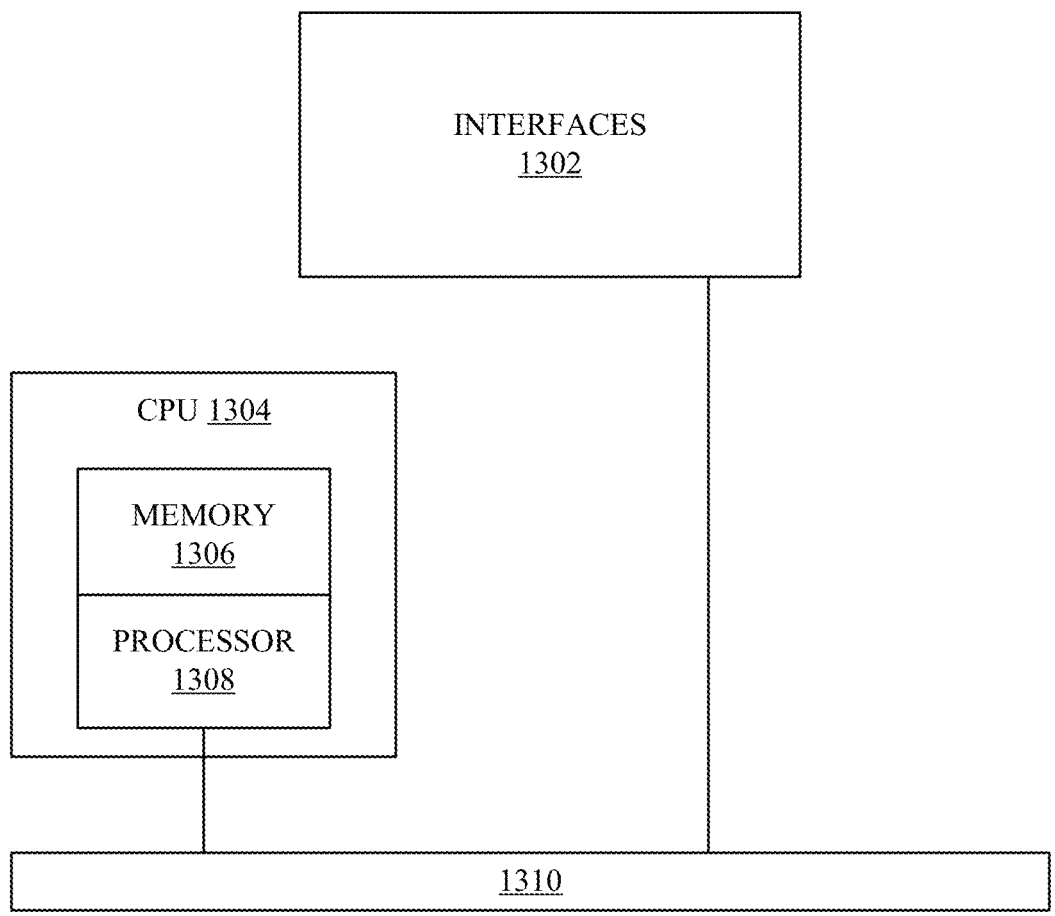
FIG. 13 illustrates an example network device.

A description of network environments and architectures for network data access and services, as illustrated in FIGS. 1A, 1B, 2A, 2B is first disclosed herein. A discussion of systems, methods, and computer-readable media for controlling transmission of data in MPTCP connections over low and high cost links based on monetary transmission costs, as shown in FIGS. 3-11C, will then follow. The discussion then concludes with a brief description of example devices, as illustrated in FIGS. 12 and 13. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
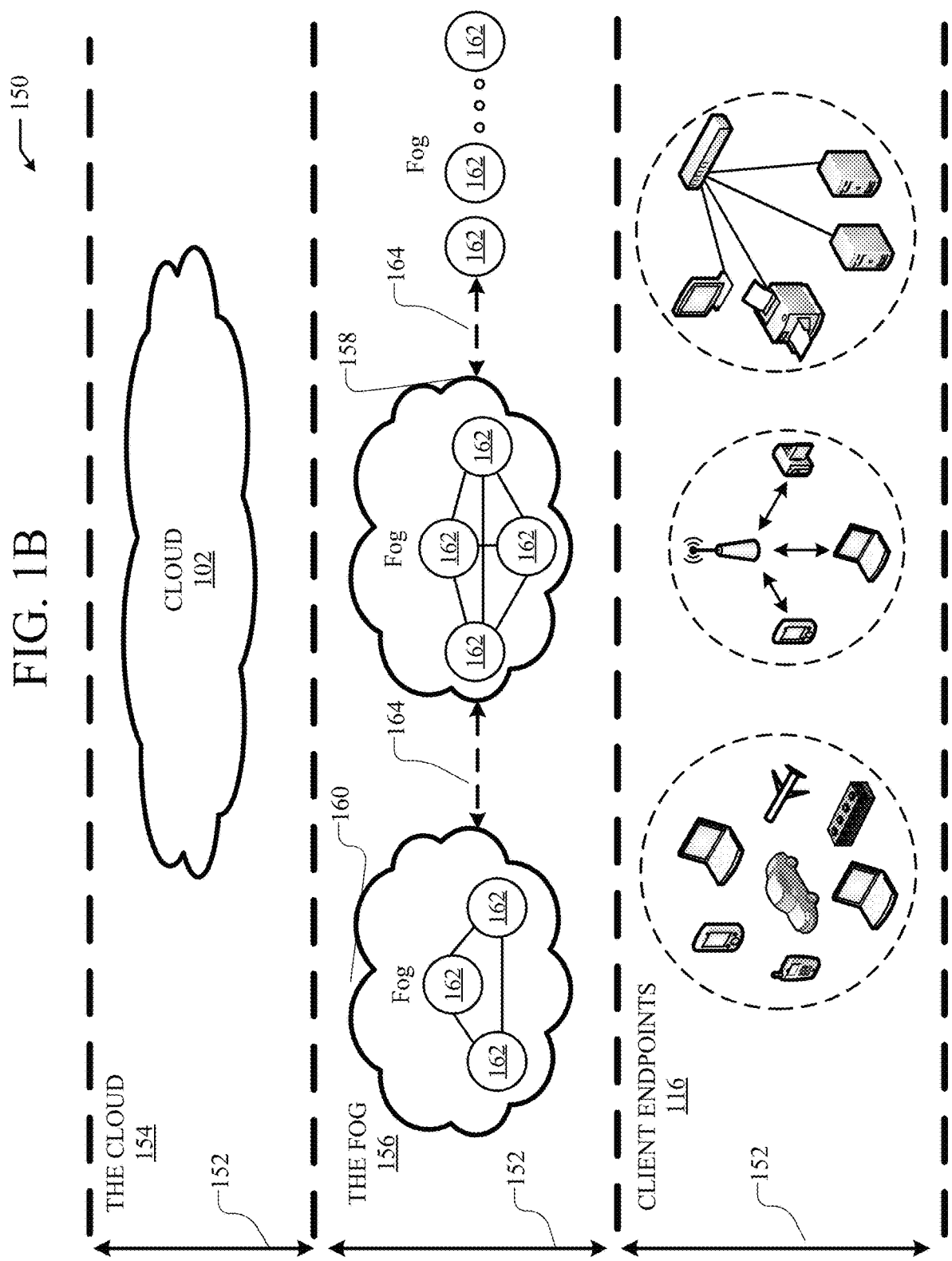
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographical locations, logical locations or networks, and/or fog instances while maintaining connectivity with the cloud layer 154 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
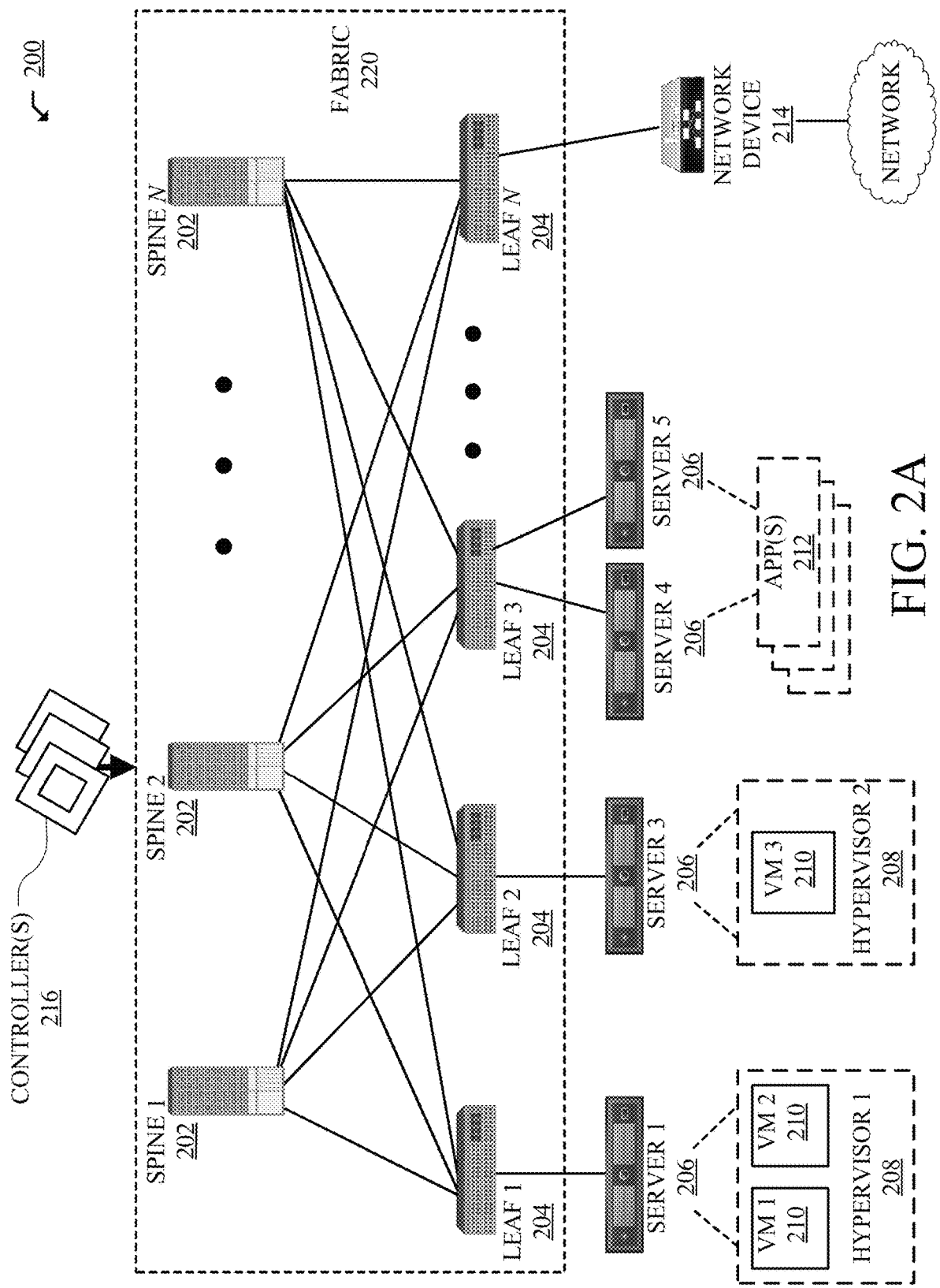
FIG. 2A illustrates a diagram of an example network environment, such as a data center.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 can be migrated to other Servers 206. Servers 206 can similarly be migrated to other physical locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined networking (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups, Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular SDN solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by ACI virtual edge (AVE), which can run on a host, such as a server, e.g. a vSwitch running on a server. For example, the AVE can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a SDN infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), AVE nodes, vector packet processing (VPP) switches; VCENTER and NSX MANAGERS; bare metal physical hosts; HYPER-V hosts; VMs; DOCKER Containers; etc.

Figure 2B:
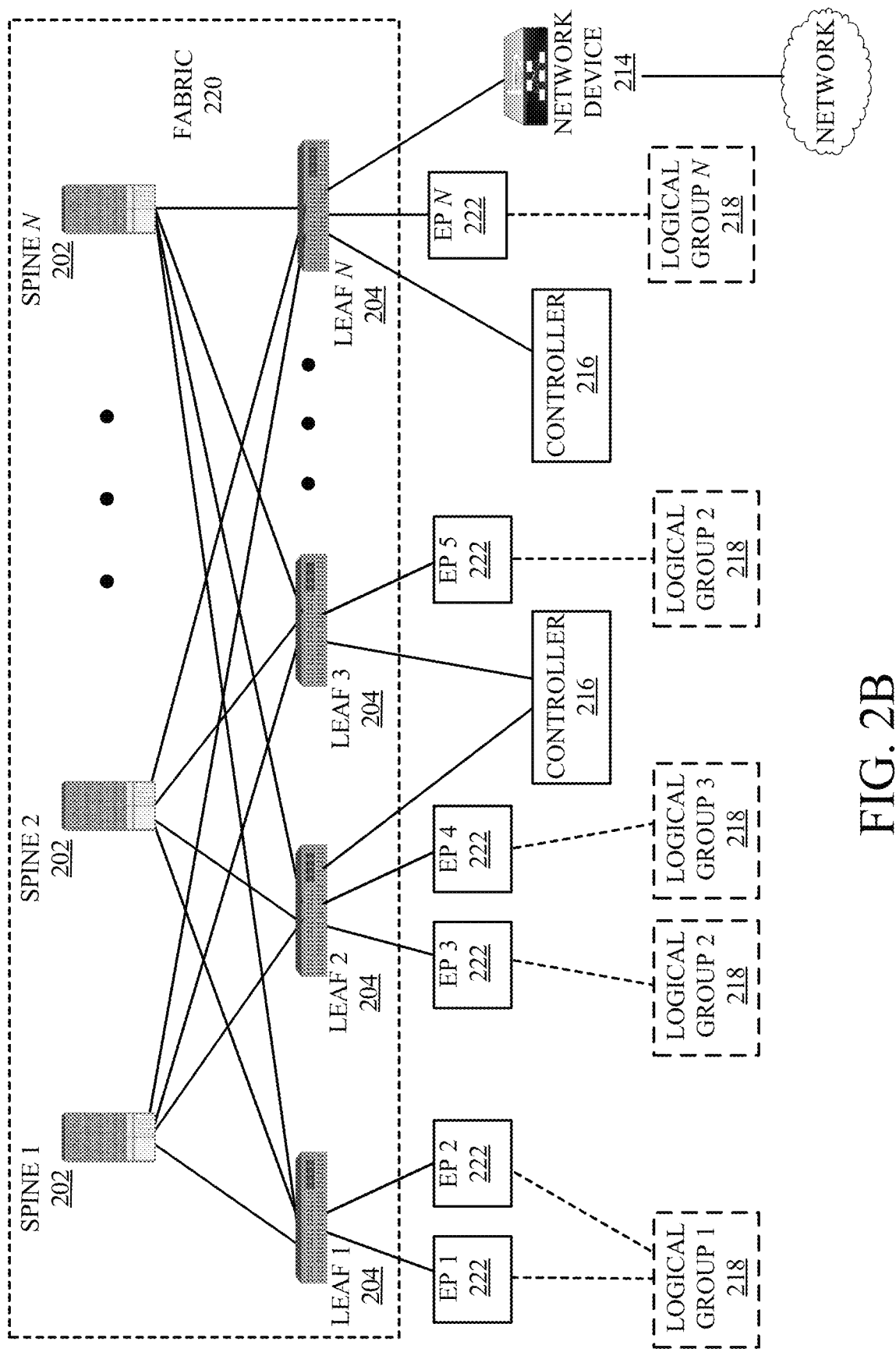
FIG. 2B illustrates another example of a network environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between EPs or EPGs. For example, a Web EPG can provide a service that a Client EPG consumes, and that consumption can be subject to a filter (ACL) and a service graph that includes one or more services, such as firewall inspection services and server load balancing.

As discussed previously, MPTCP provides the ability to simultaneously use multiple paths between two TCP peers. Using MPTCP extensions, a TCP application client and an application server, e.g. two MPTCP peers, can establish multiple TCP subflows over different access networks and split the data stream over those paths and links. This essentially offers the key benefits of better user experience in the form of both higher throughput and also increased resiliency to path failures.

Recently, standards bodies, e.g. the Internet Engineering Task Force (IETF), and researchers have analyzed the MPTCP protocol, RFC 6824, thoroughly and greatly improved performance of MPTCP connections established and maintained according to the protocol. One goal of improving the MPTCP protocol has focused on efficient utilization of links/TCP subflows to realize a higher aggregate application throughput.

However, one of the fundamental gaps in the protocol is the lack of awareness on the monetary cost associated with a given link. For example, one of the two access links used to establish MPTCP subflows may be a metered link where a customer pays for every octet of data transmission, e.g. an LTE link. Further, the other link may either be a link with no usage-based cost associated with it, or a link with a flat-rate cost, e.g. WiFi. In turn, consideration of incurring minimal costs to a user while still providing the best user experience in forming an MPTCP connection over such links is lacking in the current MPTCP protocol. Specifically, such consideration is not present in the protocol, at a local peer, a remote peer, or in data distribution techniques for forming MPTCP connections.

The present includes systems, methods, and computer-readable media for controlling data distribution in TCP subflows of a MPTCP connection based on monetary cost. A low cost link and a high cost link of TCP subflows of a MPTCP connection formed between a first MPTCP peer and second MPTCP peer can be identified. A congestion level on the low cost link can be determined based on feedback from a TCP congestion control mechanism for the MPTCP connection. Further, whether to send a data packet in the MPTCP connection over the low cost link or the high cost link can be determined based on the congestion level on the low cost link and a lower cost of the low cost link compared to a cost of the high cost link. As follows, the data packet can be sent over the low cost link as part of the MPTCP connection if it is determined to send the data packet over the low cost link. Further, the data packet can be sent over the high cost link as part of the MPTCP connection if it is determined to send the data packet over the high cost link.

Figure 3:
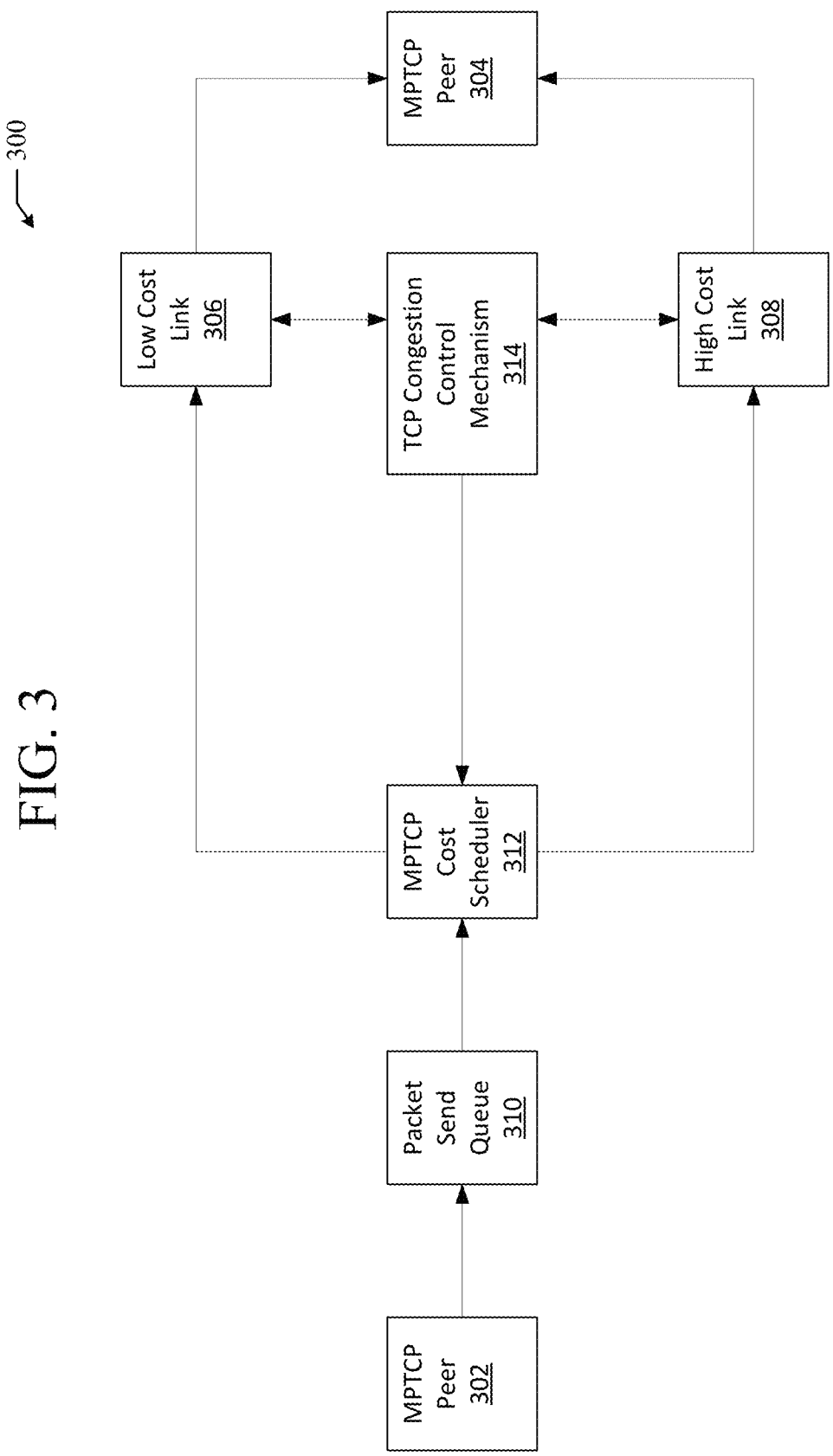
FIG. 3 shows an example MPTCP connection that is controlled based on monetary link transmission costs.

FIG. 3 shows an example MPTCP connection 300 that is controlled based on monetary link transmission costs. Specifically, data transmission in the MPTCP connection 300 can be controlled, at least in part, based on monetary costs associated with TCP subflows forming the MPTCP connection 300. The MPTCP connection 300 can be implemented, at least in part, through an applicable network environment, such as the network environments 100, 150, and 200 shown in FIGS. 1A, 1B, 2A, and 2B.

The example MPTCP connection 300 shown in FIG. 3 includes a first peer 302 and a second peer 304. The first peer 302 and the second peer 304 can exchange data with each other through the MPTCP connection 300. Specifically, the first peer 302 and the second peer 304 can be implemented as an applicable application or an applicable device for sending and receiving data as part of providing and/or accessing network services through the MPTCP connection 300. For example, the first peer 302 can be implemented as an application executing at a client device, while the second peer 304 can be implemented as an application at a server. In another example, the first peer 302 can be implemented as an application executing at a first client device, while the second peer 304 can be implemented as an application executing at a second client device.

The MPTCP connection 300 is formed by a plurality of TCP subflows between the first MPTCP peer 302 and the second MPTCP peer 304. Specifically, the MPTCP connection 300 is formed by a low cost link 306 and a high cost link 308 forming different TCP subflows between the first MPTCP peer 302 and the second MPTCP peer 304. In MPTCP connections, each subflow uses different IP addresses and can be routed over different access networks. A low cost link is a link that has a lower monetary cost to transmit data over the link when compared to a cost to transmit data over a high cost link. Vice versa, a high cost link is a link that has a higher monetary cost to transmit data over the link when compared to a cost to transmit data over a low cost link. In various embodiments, a low cost link can be a free monetary link that does not incur any monetary costs to a user in transmitting data over the free monetary link.

In the MPTCP connection 300 shown in FIG. 3, the low cost link 306 can be formed over a free network, while the high cost link 308 is implemented over a monetary cost network. A monetary cost network, as used herein, is a network that costs some form of monetary value to transmit data over the network while a free network, as used herein, is a network that does not cost any form of monetary value to transmit data over the network. For example, the low cost link 306 can be implemented over a WiFi network, while the high cost link 308 can be implemented over an LTE network. While only a single low cost link 306 and a single high cost link 308 are shown in the example MPTCP connection 300, the MPTCP connection 300 can include additional links/subflows, e.g. a plurality of low cost links and a plurality of high cost links.

In typical MPTCP connections, peers spread data over different interfaces of a host, moving traffic away from congested links. In this mode, the goal is to realize maximum aggregate throughput while the distribution function treating all links as equal-cost links. This is problematic, as all links are not equal cost links. Instead, some links are low cost links while other links can be high cost links that require a payment of monetary value to transmit data across the links. This creates the previously described need for factoring cost into controlling data transmission through MPTCP connections. Further, typical MPTCP connections also have an additional operational mode which allows MPTCP peers to use a sub flow path as a backup path. Specifically, the backup path can be used when there is no connectivity over one or more primary paths. Similar to the previously described operation mode, data transmission through the backup path is controlled without consideration to actual monetary costs associated with transmitting the data through the backup path. In turn, this creates the previously described need for factoring cost into controlling data transmission through MPTCP connections.

The example MPTCP connection 300 shown in FIG. 3 includes a packet send queue 310, an MPTCP cost scheduler 312, and a TCP congestion control mechanism 314. The packet send queue 310, the MPTCP cost scheduler 312, and the TCP congestion control mechanism 314 function to operate together to control transmission of data packets through the low cost link 306 and the high cost link 308 as part of transmitting data through the MPTCP connection 300. Specifically, transmission of data packets through the MPTCP connection 300 can be controlled to selectively transmit the data packets through either the low cost link 306 or the high cost link 308 based on costs associated with data packet transmission. Further, transmission of data packets through the MPTCP connection 300 can be controlled to transmit data packets based on costs associated with transmitting the data packets while increasing throughput or maintaining specific throughput requirements in the MPTCP connection 300.

The packet send queue 310 functions to receive data packets for transmission through the MPTCP connection 300. Specifically, the packet send queue 310 can receive data packets from the first MPTCP peer 302 for transmission to the second peer 304 through the MPTCP connection 300. More specifically, the packet send queue 310 can receive data packets from the first MPTCP peer 302 for transmission to the second peer 304 through either the low cost link 306 or the high cost link 308, e.g. on a per-packet basis.

The MPTCP cost scheduler 312 functions to control packet transmission through the low cost link 306 and the high cost link 308. The MPTCP cost scheduler 312 functions to control packet transmission through the low cost link 306 and the high cost link 308 based on costs associated with packet transmission through the low cost link 306 and the high cost link 308, herein referred to as costs of the low cost link 306 and the high cost link 308. In particular, the MPTCP cost scheduler 312 can control packet transmission through the low cost link 306 and the high cost link 308 based on the a lower cost of the low cost link compared to a cost of the high cost link. For example, the MPTCP cost scheduler 312 can favor transmitting packets over the low cost link 306 instead of the high cost link 308 as the low cost link 306 incur no or lower costs for transmitting the data over the link. In controlling packet transmission over the low cost link 306 and the high cost link 308, the MPTCP cost scheduler 312 can actually determine whether to send data over the low cost link 306 or the high cost link 308. As follows, the MPTCP cost scheduler 312 can send the data over the low cost link 306 or the high cost link 308 based on the link it chooses to deliver the data.

In controlling packet transmission based on monetary transmission costs, the MPTCP cost scheduler 312 can also control packet transmission based on traffic congestion/congestion levels in either or both the low cost link 306 and the high cost link 308. For example, the MPTCP cost scheduler 312 can direct all traffic through the low cost link 306 to reduce costs of transmitting the traffic through the MPTCP connection 300. Further, once the low cost link 306 becomes too congested with traffic, the MPTCP cost scheduler 312 can begin directing traffic to the high cost link 308. Traffic congestion, as used herein, can include data throughput for each link in the MPTCP connection 300, e.g. the low cost link 306 and the high cost link 308, as measured on a per-link basis. For example, traffic congestion of the low cost link 306 can include the rate at which data is successfully transmitted through the low cost link 306 to a destination, e.g. an intended destination.

In controlling packet transmission based on traffic congestion and monetary transmission costs, the MPTCP cost scheduler 312 can also control packet transmission based on throughput requirements. Specifically, the MPTCP cost scheduler 312 can control packet transmission based on traffic congestion in either or both the low cost link 306 and high cost link 308 in order to meet throughput requirements. More specifically, the MPTCP cost scheduler 312 can send data over the high cost link 308 on a need basis, e.g. when the low cost link 306 is unable to meet a MPTCP throughput requirement at a given moment. Throughput requirements can include the same throughput or an increased throughput achieved through the MPTCP connection 300 when compared to data transmitted according to a standard MPTCP operation mode, e.g. a mode that does not control transmission based on monetary transmission costs. For example, data can normally have a throughput of b 2 Mbps when transmitted through the MPTCP connection 300 using a standard MPTCP operation mode, e.g. based on congestion level alone without considering actual monetary transmission costs. As follows, the MPTCP cost scheduler 312 can control transmission of data through the low cost link 306 and the high cost link 308 based on traffic congestion and monetary transmission costs while still achieving a throughput of at least 2 Mbps, and potentially an increased throughput.

As will be discussed in greater detail later, the MPTCP cost scheduler 312 can control packet transmission based on a bandwidth cap rate, e.g. as part of a throughput requirement, for transmitting data through the MPTCP connection. A bandwidth cap rate can specify an operating bandwidth level at which data should be transferred at through the MPTCP connection 300. For example, the MPTCP cost scheduler 312 can selectively control data transmission over the low cost link 306 and the high cost link 308 such that the data is transmitted at the bandwidth cap rate or faster than the bandwidth cap rate. The bandwidth cap rate can be defined by a user, e.g. through the use of a policy layer.

The MPTCP cost scheduler 312 can identify traffic congestion levels as part of controlling transmission of data through the low cost link 306 and the high cost link based on traffic congestion levels and monetary cost. Specifically, the MPTCP cost scheduler can identify traffic levels in either or both the high cost link 308 and the low cost link 306 to determine whether to transmit data through the corresponding links based on monetary transmission cost and traffic congestion levels. Traffic congestion levels in a link, as used herein, include values of applicable parameters describing data throughput, consumed bandwidth, and/or available bandwidth in the link.

The TCP congestion control mechanism 314 functions to control congestion in the subflows, e.g. the low cost link 306 and the high cost link 308, of the MPTCP connection 300. The TCP congestion control mechanism 314 can be an applicable congestion control mechanism for controlling data transmission in a TCP or MPTCP connection. Specifically, the TCP congestion control mechanism 314 can be a loss sensitive control mechanism. A loss sensitive control mechanism, as used herein, can be an applicable control mechanism that controls congestion in a TCP or MPTCP connection based on packet loss. Further, the TCP congestion control mechanism 314 can be a loss insensitive control mechanism. A loss insensitive control mechanism, as used herein, can be a control mechanism that controls congestion in a TCP or MPTCP connection based on actual congestion in the TCP or MPTCP connection. For example, a loss insensitive control mechanism can be a bottleneck bandwidth (BBW) and round-trip propagation time (RTT), herein referred to as (BBR) control mechanism. While reference is made to the BBR control mechanism herein, in various embodiments, the systems, methods, and computer-readable mediums described herein are not limited to the BBR control mechanism but can also be applied to an applicable loss insensitive TCP control mechanism.

The MPTCP cost scheduler 312 can identify traffic congestion levels in the low cost link 306 and the high cost link 308 based on feedback from the TCP congestion control mechanism 314. Feedback from the TCP congestion control mechanism 314 can include applicable information of the TCP congestion control mechanism 314 in controlling congestion in the MPTCP connection 300. Specifically, feedback from the TCP congestion control mechanism 314 can include values of specific parameters used by the TCP congestion control mechanism 314 to control traffic congestion. As a result, traffic congestion levels can be identified from the specific parameters used by the TCP congestion control mechanism 314 to control traffic congestion. For example and as will be discussed in greater detail later, when the TCP congestion control mechanism 314 is a loss sensitive control mechanism, then the feedback from the TCP congestion control mechanism 314 can include space in packet congestion windows of the low cost link 306 and the high cost link 308. As follows, traffic congestion levels can be identified based on the space in packet congestion windows of the corresponding links 306 and 308. In another example and as will be discussed in greater detail later, when the TCP congestion control mechanism 314 is a loss insensitive control mechanism, then the feedback from the TCP congestion control mechanism 314 can include a RTT, a BBW, and a pacing gain associated with the low cost link 306 and the high cost link 308. As follows, traffic congestion levels can be identified based on RTTs, BBWs, and pacing gains of the corresponding links 306 and 308.

The MPTCP cost scheduler 312 can identify the low cost link 306 and the high cost link 308 of the MPTCP connection 300, e.g. for purposes of controlling data transmission based on monetary value. The MPTCP cost scheduler 312 can identify the low cost link 306 and the high cost link 308 based on exchange of information between the first MPTCP peer 302 and the second MPTCP peer 304. Specifically, the MPTCP cost scheduler 312 can use MP-JOIN messages and MP-PRIO messages exchanged between the first MPTCP peer 302 and the second MPTCP peer 304 to identify the low cost link 306 as a link of the MPTCP connection 300 that does not have monetary cost for transmission. As follows, the MPTCP cost scheduler 312 can use MP-JOIN messages and MP-PRIO messages exchanged between the first MPTCP peer 302 and the second MPTCP peer 304 to identify the high cost link 308 as a link that does have a monetary cost for transmission. In identifying the low cost link 306 as a low cost link for data transmission, the MPTCP cost scheduler 312 can tag the link as a low cost link or a free cost link. Further, in identifying the high cost link 308 as a cost link for data transmission, the MPTCP cost scheduler 312 can tag the link as a cost link. As follows, the MPTCP cost scheduler 312 can transmit data through the corresponding low cost link 306 and the high cost link 308 based on the corresponding cost tags associated with the links 306 and 308.

As will be discussed in greater detail later, the MPTCP cost scheduler 312 can identify the low cost link 306 for transmitting data from a plurality of low cost links in the MPTCP connection 300. Further, the MPTCP cost scheduler 312 can identify the high cost link 308 for transmitting data from a plurality of high cost links. Specifically, the MPTCP cost scheduler 312 can identify the low cost link 306 and/or the high cost link 308 from a plurality of links based on network throughput requirements associated with the MPTCP connection. For example, if a throughput requirement for the MPTCP connection 300 is 20 Mbps, then the MPTCP cost scheduler 312 can select a low cost link that has an available bandwidth of at least 20 Mbps.

Additionally, the MPTCP cost scheduler 312 can control transmission of data through the MPTCP connection 300 over one or more backup links. A backup link, as used herein, can be a link that is different from the low cost link 306 and the high cost link 308 for transmitting data through the MPTCP connection 300. Specifically, a backup link can be a link that is not typically used to transfer data through the MPTCP connection 300. A backup link can be either a low cost link or a high cost link. In controlling transmission of data over a backup link, the MPTCP cost scheduler 312 can transmit data over the backup link if the MPTCP cost scheduler 312 fails to identify a high cost link or a low cost link in the MPTCP connection 300, e.g. the low cost link 306 and the high cost link 308. Further, the MPTCP cost scheduler 312 can transmit data over a backup link if it determines that the low cost link 306, the high cost link 308, and other applicable links of the MPTCP connection 300 are unsuitable for transmitting data, e.g. fail to have available bandwidth to meet a throughput requirement.

Figure 4:
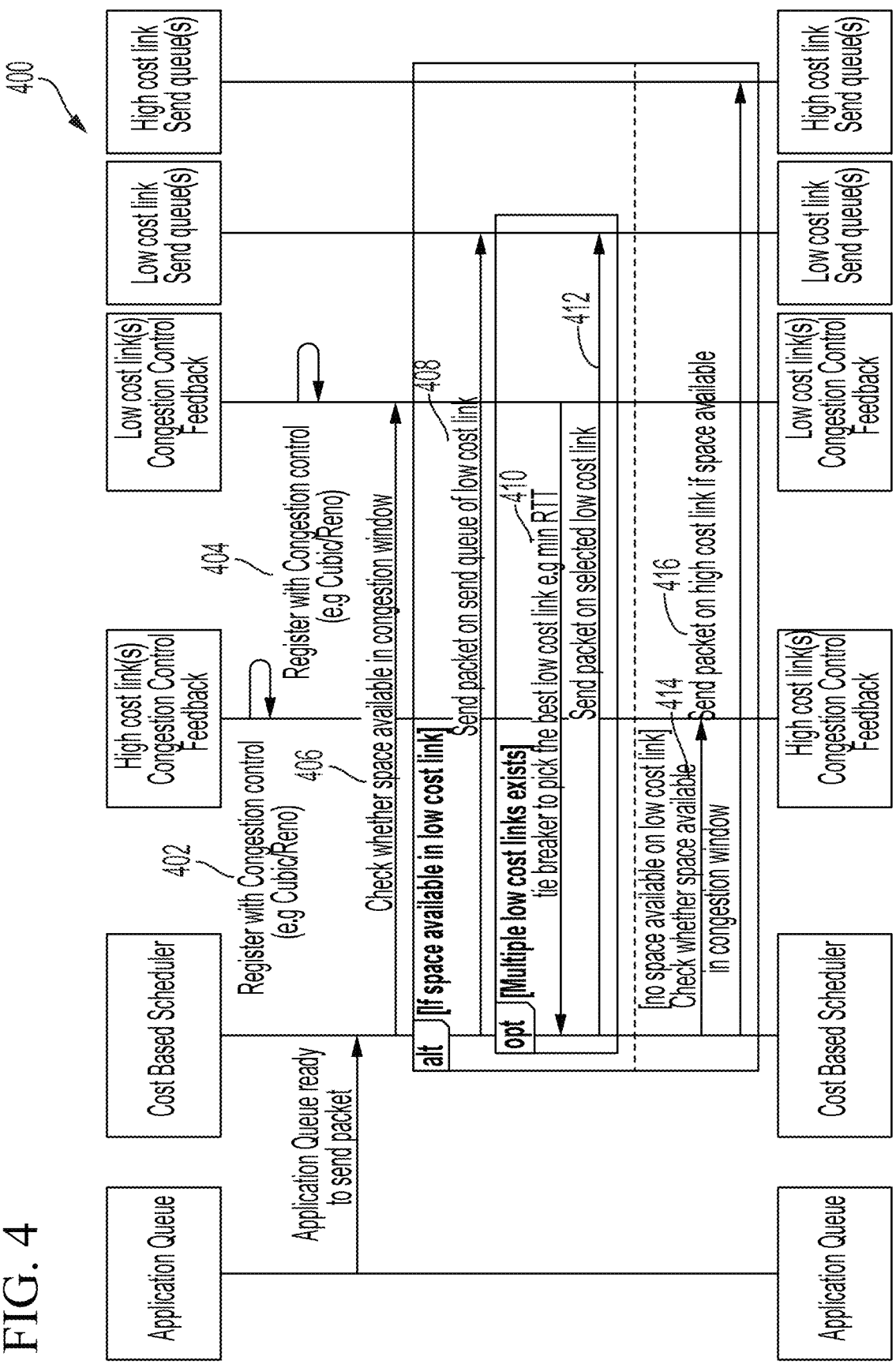
FIG. 4 illustrates a timing diagram for controlling data transmission in an MPTCP connection based on monetary link transmission cost using a loss sensitive control mechanism.

FIG. 4 illustrates a timing diagram 400 for controlling data transmission in an MPTCP connection based on monetary link transmission cost using a loss sensitive control mechanism. Specifically, the timing diagram 400 can be implemented using a standard loss sensitive control mechanism/TCP congestion control mechanism for controlling traffic congestion in an MPTCP connection based on packet loss in links of the MPTCP connection. The example timing diagram 400 can be implemented, at least in part, using an applicable scheduler for controlling data transmission in an MPTCP connection based on monetary transmission costs, such as the MPTCP cost scheduler 312 shown in FIG. 3.

In the timing diagram 400, at steps 402 and 404, the cost based scheduler registers with a TCP congestion control mechanism for an MPTCP connection. As discussed previously, for the timing diagram 400 shown in FIG. 4, the TCP congestion control mechanism is an applicable loss sensitive control mechanism. In response to registering with the TCP congestion control mechanism, at steps 402 and 404, the cost based scheduler can receive feedback from the congestion control mechanism for both a low cost link and a high cost link of the MPTCP connection. The feedback from the TCP congestion control mechanism can include applicable information related to traffic congestion in the low cost link and the high cost link. Specifically, the feedback from the TCP congestion control mechanism can include information/metric value(s) used by the loss sensitive congestion control mechanism in managing congestion in the high cost link and the low cost link according to a loss sensitive technique. For example, the feedback received from the congestion control mechanism can include an amount of space in packet congestion windows of the low cost link and the high cost link.

An MPTCP peer can then place a data packet for transmission through the MPTCP connection into a queue, e.g. the application queue. Once the data packet is placed in the queue, the cost based scheduler can determine whether the low cost link is suitable for transmitting the data packet. Specifically, the cost based scheduler can determine whether the low cost link is suitable for transmitting the data packet based on traffic congestion in the low cost link, and potentially based on throughput requirements. More specifically, at step 406, the cost based scheduler can determine whether the low cost link is suitable for transmitting the data packet based on an amount of available space in a congestion window associated with the low cost link, based on feedback received from the TCP congestion control mechanism. Subsequently, at step 408, the cost based scheduler can send the data packet through the low cost link if it determines the low cost link is suitable for transmitting the packet, e.g. based on the available space in the congestion window of the low cost link.

Alternatively, at steps 410 and 412, the cost based scheduler can select a low cost link of a plurality of low cost links to use in transmitting the data packet and subsequently transmit the packet using the selected low cost link. Specifically, the cost based scheduler can select a low cost link of a plurality of low cost links based on applicable performance characteristics, e.g. data scheduler criterion, of the low cost links. For example, the cost based scheduler can select a low cost link from a plurality of low cost links based on RTTs of the low cost links. Further in the example, the cost based scheduler can select the low cost link having the shortest RTT from the plurality of low cost links. The cost based scheduler can be configured to perform step 410 before the steps of 406 and 408 of determining whether to send the data packet over the low cost link and actually sending the packet over the low cost link. In turn, the cost based scheduler can determine whether to send the packet over the selected low cost link based on traffic congestion on the low cost link and subsequently, at step 412, send the packet over the selected low cost link. Effectively, step 412 can replace step 408 when the cost based scheduler selects a low cost link from a plurality of low cost links.

If the cost based scheduler determines to not send the data using the low cost link, e.g. the selected low cost link, then the cost based scheduler can attempt to transmit the data on the high cost link. Specifically, the cost based scheduler can attempt to send the data packet on the high cost link on a need basis, e.g. according to throughput requirements, in order to transmit the data packet based on monetary transmission costs. At step 414, the cost based scheduler can determine the high cost link can transmit the data packet based on traffic congestion levels in the high cost link, e.g. in order to meet throughput requirements. Specifically, the cost based scheduler can determine whether there is enough available space in a congestion window associated with the high cost link to transfer the data packet, e.g. in order to meet throughput requirements. More specifically, the cost based scheduler can determine whether there is available space in the congestion window using feedback from the TCP congestion control mechanism of the high cost link. While not shown in the timing diagram 400, the cost based scheduler can also be configured to select the high cost link from a plurality of high cost links, similar as to the previously described techniques for selecting the low cost link from a plurality of low cost links.

The cost based scheduler, at step 416, can then transmit the data packet over the high cost link if it determines to transmit the data packet using the high cost link. Specifically, if the cost based scheduler determines to transmit the data packet over the high cost link based on traffic congestion levels in the high cost link, then the cost based scheduler can transmit the data packet, at step 416, over the high cost link.

The following illustrates example pseudo-code for implementing the functionalities for the timing diagram 400 shown in FIG. 4.

```
Function subflow_okay_to_send(subflow, bandwidth_check):
    If (!subflow.is_valid) :
        return False
    If (sublow.in_flight > subflow.cwnd) :
        return False
    return True
    function get_best_subflow(subflows, scheduler_criteria,
    satisfies_bw, link_type):
        for each subflow in subflows:
            if ( subflow_okay_to_send(subflow))
                best_subflow = get_best_subflow(scheduler_criteria)
        function link_cost_scheduler(subflows)
            subflow = get_best_subflow( scheduler_criteria = minRTT ,
    cost = Free, active = True)
                if (no subflow exists)
                    subflow = get_best_subflow(scheduler_criteria =
    minRTT , cost = Any, active = True)
                if (no subflow exist)
                    subflow = get_best_subflow(scheduler_criteria =
    minRTT, backup = True)
```

Figure 5:
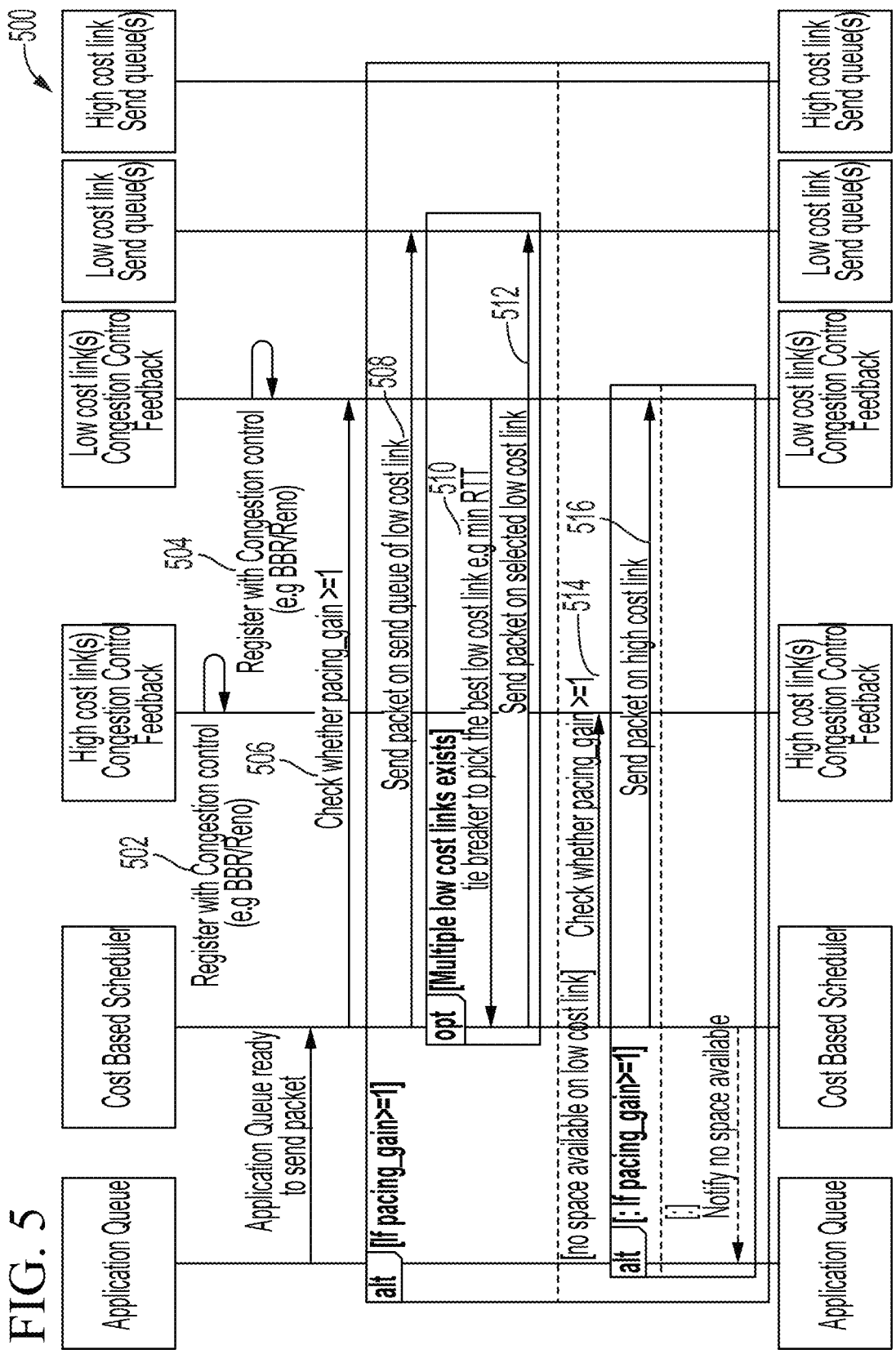
FIG. 5 illustrates a timing diagram for controlling data transmission in an MPTCP connection based on monetary link transmission cost using a loss insensitive control mechanism.

FIG. 5 illustrates a timing diagram 500 for controlling data transmission in an MPTCP connection based on monetary link transmission cost using a loss insensitive control mechanism. Specifically, the timing diagram 500 can be implemented using a standard loss insensitive control mechanism/TCP congestion control mechanism for controlling traffic congestion in an MPTCP connection based on actual congestion in links of the MPTCP connection. The example timing diagram 500 can be implemented, at least in part, using an applicable scheduler for controlling data transmission in an MPTCP connection based on monetary transmission costs, such as the MPTCP cost scheduler 312 shown in FIG. 3.

In the timing diagram 500, at steps 502 and 504, the cost based scheduler registers with a TCP congestion control mechanism for an MPTCP connection. As discussed previously, for the timing diagram 500 shown in FIG. 5, the TCP congestion control mechanism is an applicable loss insensitive control mechanism, e.g. a BBR congestion control mechanism. As part of registering with the TCP congestion control mechanism, at steps 502 and 504, the cost based scheduler can receive feedback from the congestion control mechanism for both a low cost link and a high cost link of the MPTCP connection. The feedback from the TCP congestion control mechanism can include applicable information related to traffic congestion in the low cost link and the high cost link. Specifically, the feedback from the TCP congestion control mechanism can include information/ metric value(s) used by the loss insensitive congestion control mechanism in managing congestion in the high cost link and the low cost link according to a loss insensitive technique. For example, the feedback received from the congestion control mechanism can include congestion windows, RTTs, BBWs, and pacing gains of the low cost link and the high cost link. A pacing gain, as used herein, can describe how fast packets are sent through the links relative to bottleneck bandwidth. Specifically, a pacing gain can indicate how fast data packets are sent through a link without acknowledgements and subsequently be increased as data packets are sent through the link.

An MPTCP peer can then place a data packet for transmission through the MPTCP connection into a queue, e.g. the application queue. Once the data packet is placed in the queue, the cost based scheduler can determine whether the low cost link is suitable for transmitting the data packet. Specifically, the cost based scheduler can determine whether the low cost link is suitable for transmitting the data packet based on traffic congestion in the low cost link, and potentially based on throughput requirements. More specifically, the cost based scheduler can determine whether the low cost link is suitable for transmitting the data packet based on one or a combination of a send congestion window, RTTs, and a pacing gain associated with the low cost link, as indicated from feedback received from the TCP congestion control mechanism. Subsequently, at step 508, the cost based scheduler can send the data packet through the low cost link if it determines the low cost link is suitable for transmitting the packet, e.g. based on the feedback received from the TCP congestion control mechanism.

In determining whether the low cost link is suitable for transmitting the data packet, based on the pacing gain, the cost based scheduler can identify, at step 506, whether the link is in a drain mode based on the pacing gain. Subsequently, the cost based scheduler can determine that the low cost link is unsuitable for transmitting the data packet if the link is in a drain mode. In using the pacing gain to determine whether the link is in a drain mode, the cost based scheduler can determine that the low cost link is in drain mode if the pacing gain is less than 1. Accordingly, the cost based scheduler can determine that the low cost link is unsuitable for transmitting the data packet by operating in the drain mode, if the pacing gain for the link is less than 1. Further, the cost based scheduler can determine that the low cost link is suitable for transmitting the data packet if the pacing gain for the link is greater than or equal to 1.

Alternatively, at steps 510 and 512, the cost based scheduler can select a low cost link of a plurality of low cost links to use in transmitting the data packet and subsequently transmit the packet using the selected low cost link. Specifically, the cost based scheduler can select a low cost link of a plurality of low cost links based on applicable performance characteristics, e.g. data scheduler criterion, of the low cost links. For example, the cost based scheduler can select a low cost link from a plurality of low cost links based on RTTs of the low cost links. Further in the example, the cost based scheduler can select the low cost link having the shortest RTT from the plurality of low cost links. The cost based scheduler can be configured to perform step 510 before the steps of 506 and 508 of determining whether to send the data packet over the low cost link and actually sending the packet over the low cost link. In turn, the cost based scheduler can determine whether to send the packet over the selected low cost link based on traffic congestion on the low cost link and subsequently, at step 512, send the packet over the selected low cost link. Effectively, step 512 can replace step 508 when the cost based scheduler selects a low cost link from a plurality of low cost links.

If the cost based scheduler determines to not send the data using the low cost link, e.g. the selected low cost link, then the cost based scheduler can attempt to transmit the data on the high cost link. Specifically, the cost based scheduler can attempt to send the data packet on the high cost link on a need basis, e.g. according to throughput requirements, in order to transmit the data packet based on monetary transmission costs. At step 514, the cost based scheduler can determine whether the high cost link can transmit the data packet based on traffic congestion levels in the high cost link, e.g. in order to meet throughput requirements. Specifically, the cost based scheduler can determine whether the pacing gain of the high cost link is less than 1 in order to determine whether the high cost link is suitable for transmitting the data. More specifically, the cost based scheduler can determine that the high cost link is suitable for transmitting the data if the pacing gain of the high cost link is less than 1, e.g. using feedback from the TCP congestion control mechanism of the high cost link. While not shown in the timing diagram 500, the cost based scheduler can also be configured to select the high cost link from a plurality of high cost links, similar as to the previously described techniques for selecting the low cost link from a plurality of low cost links.

The cost based scheduler, at step 516, can then transmit the data packet over the high cost link if it determines to transmit the data packet using the high cost link. Specifically, if the cost based scheduler determines to transmit the data packet over the high cost link based on traffic congestion levels in the high cost link, then the cost based scheduler can transmit the data packet, at step 516, over the high cost link. More specifically, if the cost based scheduler determines that the pacing gain of the high cost link is less than 1, then the cost based scheduler can transmit the data packet over the high cost link.

The following illustrates example pseudo-code for implementing the functionalities for the timing diagram 500 shown in FIG. 5.

```
Function bandwidth_drain(subflow) :
    return (subflow.is_not_app_limited) and (subflow.pacing_gain < 1)
Function subflow_okay_to_send(subflow, bandwidth_check):
    If (!subflow.is_valid) :
        return False
    If (bandwidth_drain(subflow)
        return False
    If (sublow.in_flight > subflow.cwnd) :
        return False
    If (bandwidth_check):
        return bandwidth_check(subflow)
    return True
function get_best_subflow(subflows, scheduler_criteria, satisfies_bw,
link_type):
    for each subflow in subflows:
        if ( subflow_okay_to_send(subflow, satisfies_bw))
            best_subflow = get_best_subflow(scheduler_criteria)
function bandwidth_cost_scheduler(subflows)
    subflow = get_best_subflow( scheduler_criteria = minRTT , cost =
Free, active = True)
        if (no subflow exists)
        subflow = get_best_subflow(scheduler_criteria = minRTT ,
cost = Any, active = True)
        if (no subflow exist)
        subflow = get_best_subflow(scheduler_criteria = minRTT,
backup = True)
```

Figure 6:
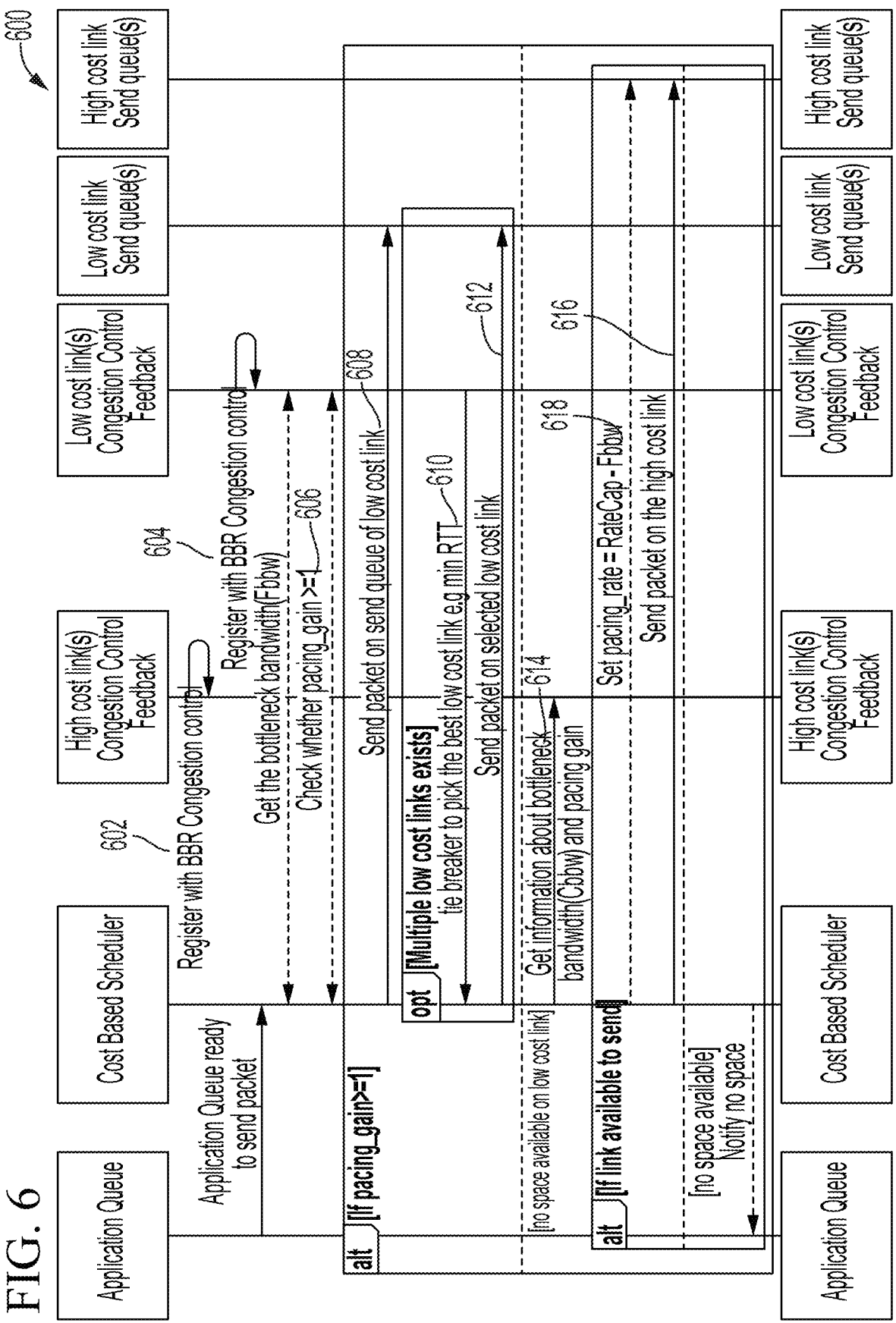
FIG. 6 illustrates a timing diagram for controlling data transmission in an MPTCP connection based on monetary link transmission cost using a loss insensitive control mechanism according to a bandwidth cap rate.

FIG. 6 illustrates a timing diagram 600 for controlling data transmission in an MPTCP connection based on monetary link transmission cost using a loss insensitive control mechanism according to a bandwidth cap rate. Specifically, the timing diagram 600 can be implemented using a standard loss insensitive control mechanism/TCP congestion control mechanism for controlling traffic congestion in an MPTCP connection based on actual congestion in links of the MPTCP connection. The example timing diagram 600 can be implemented, at least in part, using an applicable scheduler for controlling data transmission in an MPTCP connection based on monetary transmission costs, such as the MPTCP cost scheduler 312 shown in FIG. 3.

As discussed previously, a bandwidth cap rate can include a minimum throughput requirement for sending data through the MPTCP connection. A bandwidth cap rate can be set by an MPTCP peer. Further a bandwidth cap rate can be set based on types of data transmitted through the MPTCP connection.

In the timing diagram 600, at steps 602 and 604, the cost based scheduler registers with a TCP congestion control mechanism for an MPTCP connection. As discussed previously, for the timing diagram 600 shown in FIG. 6, the TCP congestion control mechanism is an applicable loss insensitive control mechanism, e.g. a BBR congestion control mechanism. As part of registering with the TCP congestion control mechanism, at steps 602 and 604, the cost based scheduler can receive feedback from the congestion control mechanism for both a low cost link and a high cost link of the MPTCP connection. The feedback from the TCP congestion control mechanism can include applicable information related to traffic congestion in the low cost link and the high cost link. Specifically, the feedback from the TCP congestion control mechanism can include information/metric value(s) used by the loss insensitive congestion control mechanism in managing congestion in the high cost link and the low cost link according to a loss insensitive technique. For example, the feedback received from the congestion control mechanism can include congestion windows, RTTs, BBWs, and pacing gains of the low cost link and the high cost link.

An MPTCP peer can place a data packet for transmission through the MPTCP connection into a queue, e.g. the application queue. Once the data packet is placed in the queue, the cost based scheduler can determine whether the low cost link is suitable for transmitting the data packet. Specifically, the cost based scheduler can determine whether the low cost link is suitable for transmitting the data packet based on traffic congestion in the low cost link, and potentially based on throughput requirements. More specifically, the cost based scheduler can determine whether the low cost link is suitable for transmitting the data packet based on one or a combination of a send congestion window, RTTs, BBW, and a pacing gain associated with the low cost link, as indicated from feedback received from the TCP congestion control mechanism. Subsequently, at step 608, the cost based scheduler can send the data packet through the low cost link if it determines the low cost link is suitable for transmitting the packet, e.g. based on the feedback received from the TCP congestion control mechanism.

In determining whether the low cost link is suitable for transmitting the data packet, based on the pacing gain, the cost based scheduler can identify, at step 606, whether the link is in a drain mode based on the pacing gain. Subsequently, the cost based scheduler can determine that the low cost link is unsuitable for transmitting the data packet if the link is in a drain mode. In using the pacing gain to determine whether the link is in a drain mode, the cost based scheduler can determine that the low cost link is in drain mode if the pacing gain is less than 1. Accordingly, the cost based scheduler can determine that the low cost link is unsuitable for transmitting the data packet by operating in the drain mode, if the pacing gain for the link is less than 1. Further, the cost based scheduler can determine that the low cost link is suitable for transmitting the data packet if the pacing gain for the link is greater than or equal to 1.

Further, in determining whether the low cost link is suitable for transmitting the data packet, the cost based scheduler can determine whether the low cost link meets the bandwidth cap rate based on traffic congestion in the low cost link. Specifically, the cost based scheduler can determine whether the low cost link meets the bandwidth cap rate based on a BBW, RTTs, and a congestion window associated with the low cost link. If the cost based scheduler determines that the low cost link does not meet the bandwidth cap rate, then the cost based scheduler, as will be discussed in greater detail later, can attempt to transmit the data packet over a high cost link.

Alternatively, at steps 610 and 612, the cost based scheduler can select a low cost link of a plurality of low cost links to use in transmitting the data packet and subsequently transmit the packet using the selected low cost link. Specifically, the cost based scheduler can select a low cost link of a plurality of low cost links based on applicable performance characteristics, e.g. data scheduler criterion, of the low cost links. For example, the cost based scheduler can select a low cost link from a plurality of low cost links based on RTTs of the low cost links. Further in the example, the cost based scheduler can select the low cost link having the shortest RTT from the plurality of low cost links. The cost based scheduler can be configured to perform step 610 before the steps of 606 and 608 of determining whether to send the data packet over the low cost link and actually sending the packet over the low cost link. In turn, the cost based scheduler can determine whether to send the packet over the selected low cost link based on traffic congestion on the low cost link and subsequently, at step 612, send the packet over the selected low cost link. Effectively, step 612 can replace step 608 when the cost based scheduler selects a low cost link from a plurality of low cost links.

If the cost based scheduler determines to not send the data using the low cost link, e.g. the selected low cost link, then the cost based scheduler can attempt to transmit the data on the high cost link. Specifically, at step 614, the cost based scheduler can retrieve information, from the TCP congestion control mechanism, related to traffic congestion in the high cost link, e.g. RTTs, BBW, pacing gain, and a traffic congestion window associated with the high cost link. Based on the traffic congestion in the high cost link, as determined by feedback from the TCP congestion control mechanism, the cost based scheduler can determine whether the high cost link meets the bandwidth cap rate.

If the cost based scheduler determines that the high cost link meets the bandwidth cap rate, then the cost based scheduler can send the data packet, at step 616, through the high cost link. The cost based scheduler can send the data packet through the high cost link based on the traffic congestion level on the low cost link over which the cost based scheduler refrains from sending the data packet. Specifically, at step 618, the cost based scheduler can set a pacing rate of the high cost link at a difference between the bandwidth cap rate and the congestion level on the low cost link, e.g. a delta bandwidth. Subsequently, the cost based scheduler can send the data packet, at step 616, over the high cost link at the set pacing rate.

In various embodiments, the high cost link can be selected from a plurality of high cost links. Specifically, the high cost link can be selected from a plurality of high cost links based on the bandwidth cap rate. In particular, only high cost links that meet or exceed the bandwidth cap rate can be selected as candidate high cost links for sending the data packet.

The following illustrates example pseudo-code for implementing the functionalities for the timing diagram 600 shown in FIG. 6.

```
Function subflow_okay_to_send(subflow, diff_bw):
If (!subflow.is_valid) :
    return False
    capped_cwnd = compute_capped_cwnd(subflow, diff_bw)
If (sublow.in_flight > capped_cwnd) :
    return False
    ... do other checks....
    return True
function get_best_subflow(subflows, scheduler_criteria, link_type) :
for each subflow in subflows:
if ( subflow_okay_to_send(subflow)
    best_subflow = get_best_subflow(scheduler_criteria)
function bandwidth_cost_scheduler(subflows, CapRate)
    diff_bw = CapRate
    subflow, operating_bandwidth=
    get_best_subflow( scheduler_criteria =
True, cost = Free, active = True)
    if (no subflow exists)
        diff_bw = Caprate - operating_bandwidth
        if (diff_bw > 0)
            subflow = get_best_subflow(scheduler_criteria =
minRTT, cost = Cost active = True, diff_bw)
        if (subflow exist)
            subflow.set_pacing_rate(diff_bw)
        else
            //Already operating at bandwidth more than needed.
    return None
    return subflow
```

Figure 7:
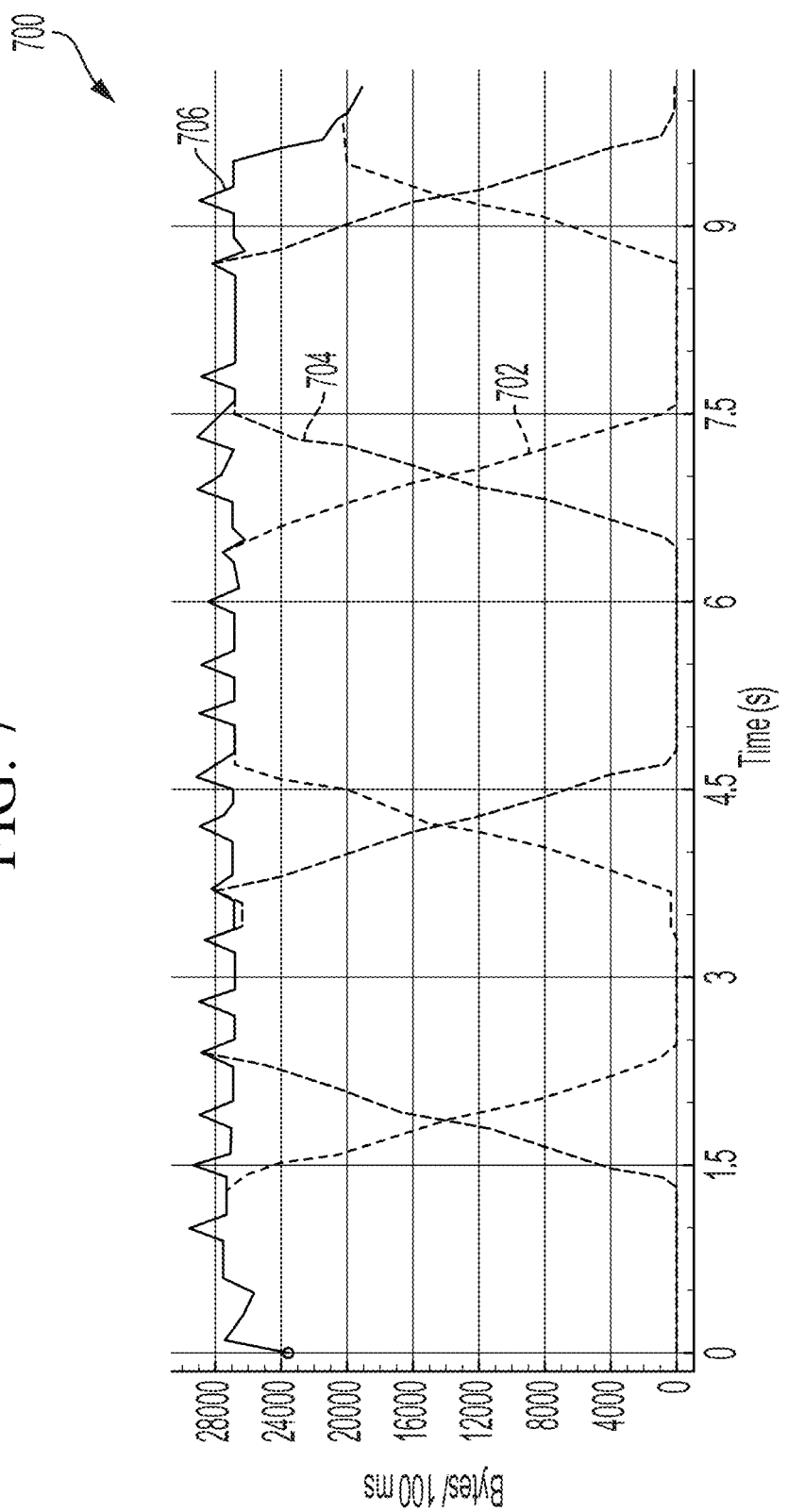
FIG. 7 is a plot of a traffic distribution spread in an MPTCP connection that is controlled irrespective of monetary link transmission cost.

FIG. 7 is a plot 700 of a traffic distribution spread in an MPTCP connection that is controlled irrespective of monetary link transmission cost. Specifically, the traffic distribution spread is shown through low cost link usage 702 and high cost link usage 704 in the MPTCP. The overall consumed bandwidth 706 is the sum of both the low cost link usage 702 and the high cost link usage 704. In the example plot 700 shown in FIG. 7, both the low cost link and the high cost link are operating with a link capacity of 2Mbps and the MPTCP application is streaming at 2 Mbps. As shown in the example plot 700, as a result of controlling packet delivery based on monetary link transmission cost, there is nearly a 50% usage rate of both the low cost link and the high cost link in the MPTCP connection. As discussed previously, this can incur unnecessary monetary costs in using the MPTCP connection.

Figure 8:
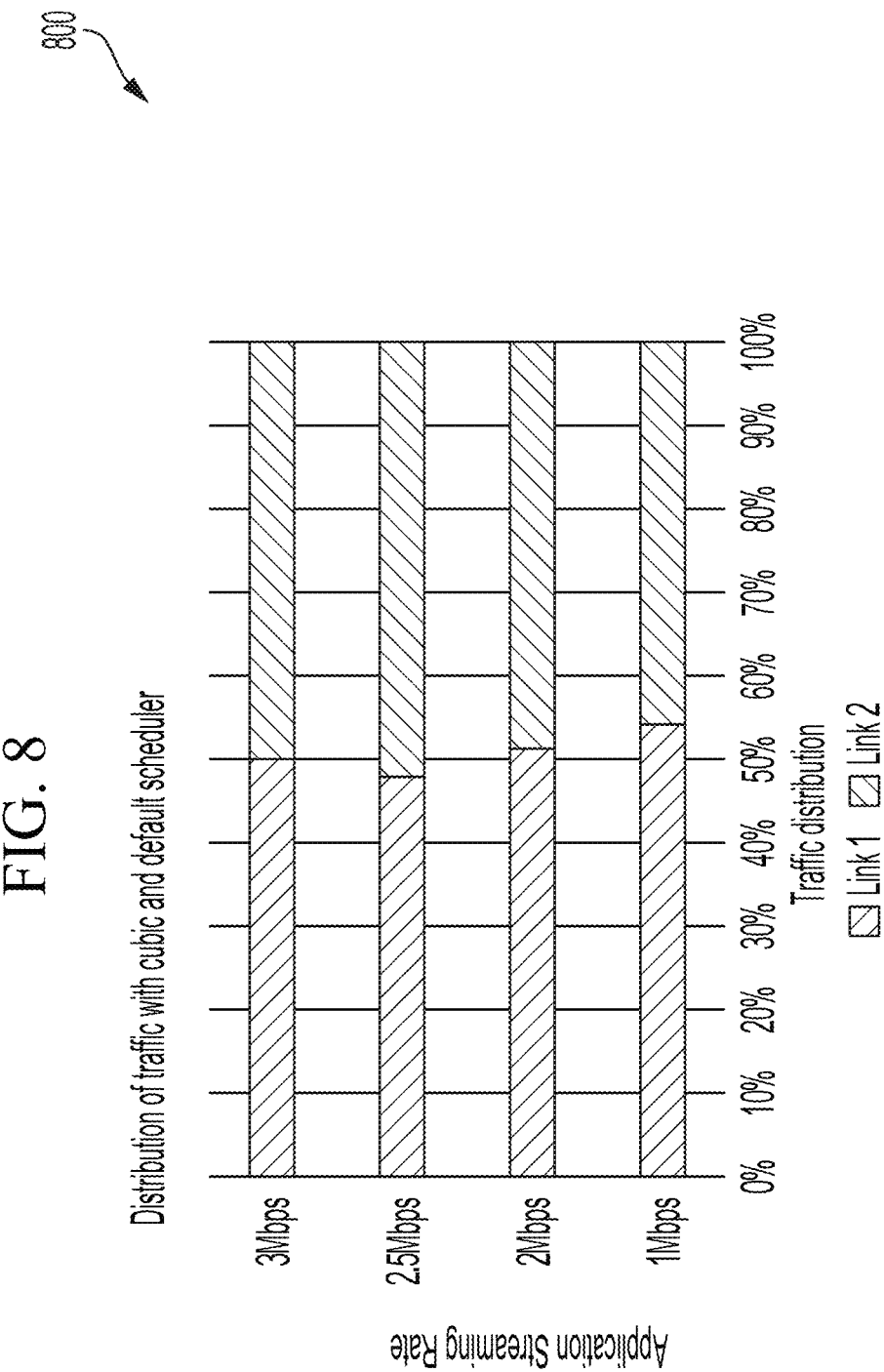
FIG. 8 shows a graph of traffic distribution in MPTCP connections that are controlled irrespective of monetary link transmission cost.

FIG. 8 shows a graph 800 of traffic distribution in MPTCP connections that are controlled irrespective of monetary link transmission cost. The MPTCP connections can represent different MPTCP connections operating at different speeds. The first link, link 1, can be a low cost link, while the second link, link 2, can be a high cost link. As shown in the graph 800, a traffic distribution of nearly 50% across the low cost link and the high cost link is observed at the various connection speeds. In turn, this can incur unnecessary monetary costs in using the MPTCP connection.

Figure 9:
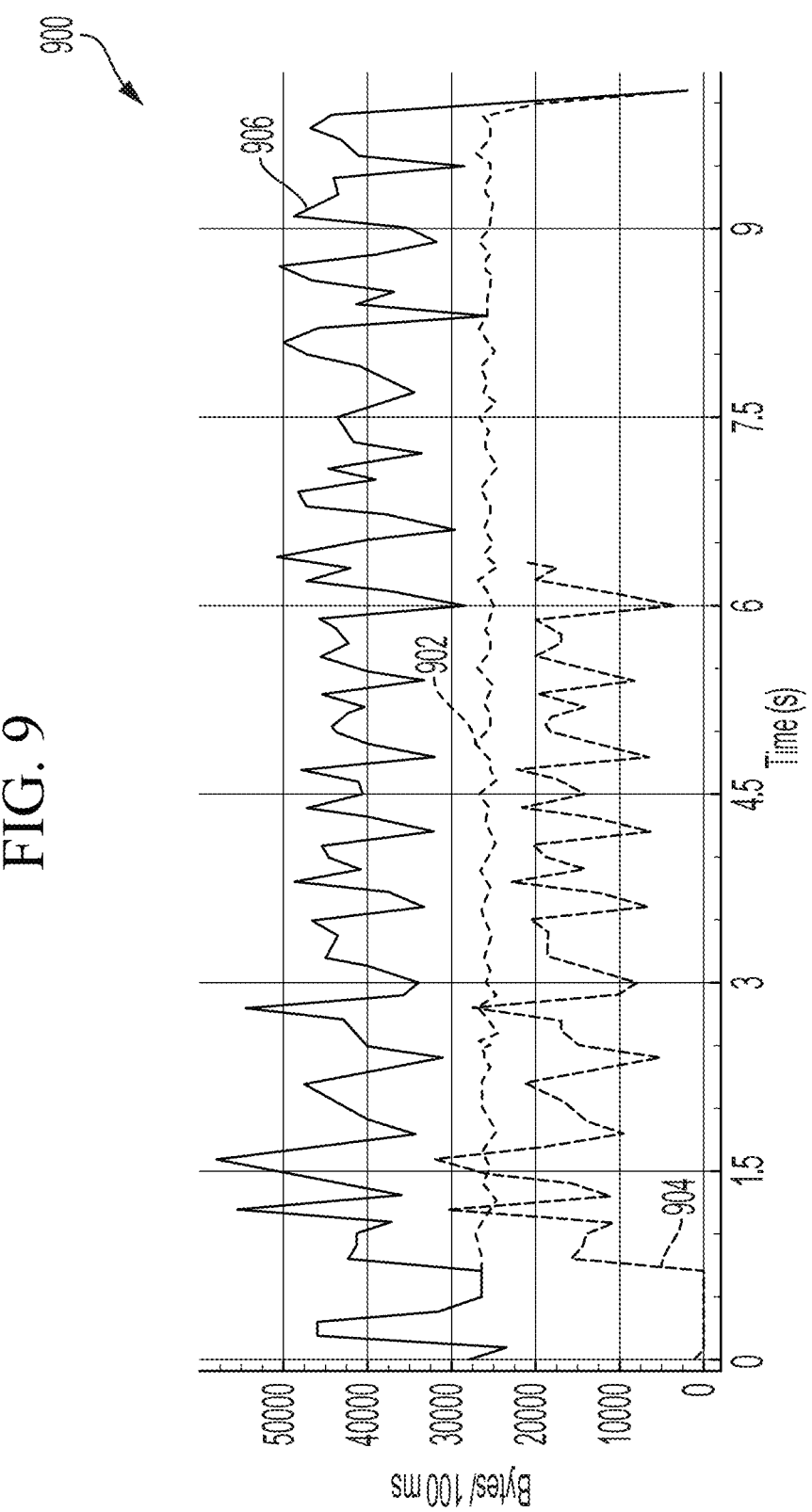
FIG. 9 is a plot of a traffic distribution spread in an MPTCP connection that is controlled based on monetary link transmission cost.

FIG. 9 is a plot 900 of a traffic distribution spread in an MPTCP connection that is controlled based on monetary link transmission costs. The traffic distribution spread is shown through low cost link usage 902, the high cost link usage 904, and the overall link usage 906. As shown in the plot 900, the low cost link usage 902 remains relatively constant, around its maximum amount of available bandwidth, while the high cost link usage 904 varies more. As the high cost link usage remains relatively constant around its maximum amount of available bandwidth, the transmission costs for the MPTCP connection are reduced, e.g. when compared to the traffic distributions shown in FIGS. 8 and 9.

Figure 10:
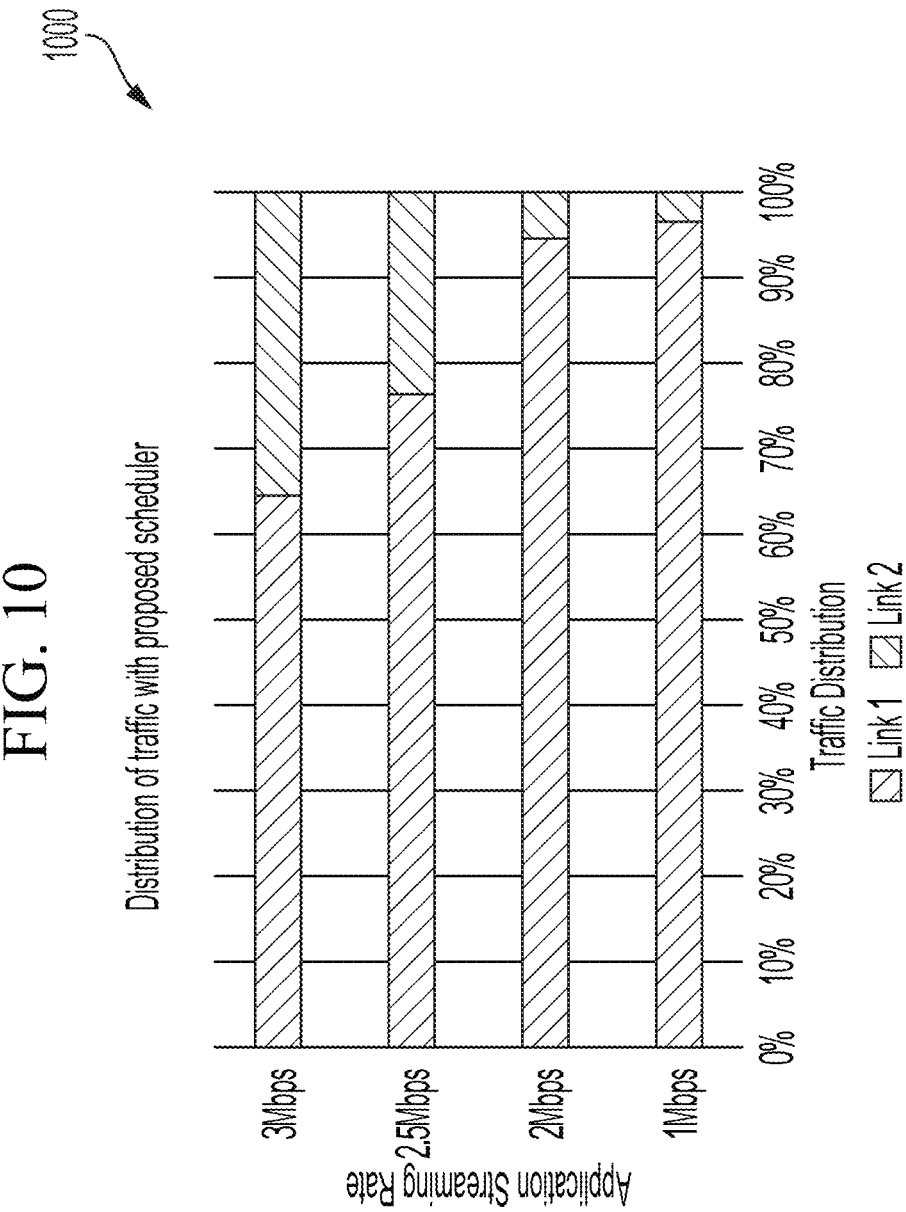
FIG. 10 is a graph of traffic distribution in different MPTCP connections that are controlled based on monetary link transmission cost.

This is further shown in FIG. 10. Specifically, FIG. 10 is a graph 1000 of traffic distribution in different MPTCP connections that are controlled based on monetary link transmission cost. The MPTCP connections can represent different MPTCP connections operating at different speeds. The first link, link 1, can be a low cost link, while the second link, link 2, can be a high cost link. As shown in FIG. 10, the free link usage is greater than 60% for the MPTCP connections at different connection speed, and above 90% for an MPTCP connection with a connection speed of 1 Mbps. The free link usage achieved when the connections are controlled based on monetary transmission cost, leads to reduce costs, e.g. when compared to the traffic distributions shown in FIGS. 8 and 9.

FIG. 11A shows a graph of low cost link usage in MPTCP connections operating at different speeds and controlled using different traffic control mechanisms. FIG. 11B shows a graph of high cost link usage in the MPTCP connections operating at different speeds and controlled using the different traffic control mechanisms. FIG. 11C shows a graph of throughput in the MPTCP connections operating at different connection speeds and controlled using the different traffic control mechanisms. The default traffic control mechanism is a traffic control mechanism that operates irrespective of monetary link transmission cost. The cubic cost mechanism is a traffic control mechanism that operates using the techniques described herein based on monetary link transmission cost using feedback from a loss sensitive TCP congestion control mechanism. The BBR cost mechanism is a traffic control mechanism that operates using the techniques described herein based on monetary link transmission cost using feedback from a loss insensitive TCP congestion control mechanism.

As shown in FIG. 11A the traffic sent on the low cost link is greater for the cubic cost mechanism and the BBR cost mechanism than the default mechanism. As shown in FIG. 11B the traffic sent on the high cost link is greater for the default mechanism than the cubic cost mechanism and the BBR cost mechanism. Further, this results in decreased monetary costs for peers in the MPTCP connection without negatively impacting application throughput in the MPTCP connections, as show in FIG. 11C.

The disclosure now turns to FIGS. 12 and 13, which illustrate example network devices and computing devices, such as switches, routers, load balancers, client devices, and so forth.

FIG. 12 illustrates a computing system architecture 1200 wherein the components of the system are in electrical communication with each other using a connection 1205, such as a bus. Exemplary system 1200 includes a processing unit (CPU or processor) 1210 and a system connection 1205 that couples various system components including the system memory 1215, such as read only memory (ROM) 1220 and random access memory (RAM) 1225, to the processor 1210. The system 1200 can include a cache 1212 of high-speed memory connected directly with, in close proximity to, or integrated as part of the processor 1210. The system 1200 can copy data from the memory 1215 and/or the storage device 1230 to the cache 1212 for quick access by the processor 1210. In this way, the cache 1212 can provide a performance boost that avoids processor 1210 delays while waiting for data. These and other modules can control or be configured to control the processor 1210 to perform various actions. Other system memory 1215 may be available for use as well. The memory 1215 can include multiple different types of memory with different performance characteristics. The processor 1210 can include any general purpose processor and a hardware or software service, such as service 1 1232, service 2 1234, and service 3 1236 stored in storage device 1230, configured to control the processor 1210 as well as a special-purpose processor where software instructions are incorporated into the actual processor design. The processor 1210 may be a completely self-contained computing system, containing multiple cores or processors, a bus, memory controller, cache, etc. A multi-core processor may be symmetric or asymmetric.

To enable user interaction with the computing device 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art. In some instances, multimodal systems can enable a user to provide multiple types of input to communicate with the computing device 1200. The communications interface 1240 can generally govern and manage the user input and system output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof.

The storage device 1230 can include services 1232, '1234, 1236 for controlling the processor 1210. Other hardware or software modules are contemplated. The storage device 1230 can be connected to the system connection 1205. In one aspect, a hardware module that performs a particular function can include the software component stored in a computer-readable medium in connection with the necessary hardware components, such as the processor 1210, connection 1205, output device 1235, and so forth, to carry out the function.

FIG. 13 illustrates an example network device 1300 suitable for performing switching, routing, load balancing, and other networking operations. Network device 1300 includes a central processing unit (CPU) 1304, interfaces 1302, and a bus 1310 (e.g., a PCI bus). When acting under the control of appropriate software or firmware, the CPU 1304 is responsible for executing packet management, error detection, and/or routing functions. The CPU 1304 preferably accomplishes all these functions under the control of software including an operating system and any appropriate applications software. CPU 1304 may include one or more processors 1308, such as a processor from the INTEL X86 family of microprocessors. In some cases, processor 1308 can be specially designed hardware for controlling the operations of network device 1300. In some cases, a memory 1306 (e.g., non-volatile RAM, ROM, etc.) also forms part of CPU 1304. However, there are many different ways in which memory could be coupled to the system.

The interfaces 1302 are typically provided as modular interface cards (sometimes referred to as "line cards"). Generally, they control the sending and receiving of data packets over the network and sometimes support other peripherals used with the network device 1300. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 1304 to efficiently perform routing computations, network diagnostics, security functions, etc.

Although the system shown in FIG. 13 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 1300.

Regardless of the network device's configuration, it may employ one or more memories or memory modules (including memory 1306) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1306 could also hold various software containers and virtualized execution environments and data.

The network device 1300 can also include an application-specific integrated circuit (ASIC), which can be configured to perform routing and/or switching operations. The ASIC can communicate with other components in the network device 1300 via the bus 1310, to exchange data and signals and coordinate various types of operations by the network device 1300, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   identifying a low cost link and a high cost link of transmission control protocol (TCP) subflows of a multipath TCP (MPTCP) connection formed between a first MPTCP peer and a second MPTCP peer based on an exchange of information between the first MPTCP peer and the second MPTCP peer to tag the high cost link as a cost link;
   determining a congestion level on the low cost link based on feedback from a TCP congestion control mechanism for the MPTCP connection;
   determining whether to send a data packet in the MPTCP connection over the low cost link or the high cost link based on the congestion level on the low cost link and a lower cost of the low cost link compared to a cost of the high cost link; and
   sending the data packet over the low cost link as part of the MPTCP connection if it is determined to send the data packet over the low cost link.

2. The method of claim 1, further comprising sending the data packet over the high cost link instead of the low cost link if it is determined to send the data packet over the high cost link based on the congestion level on the low cost link.

3. The method of claim 1, further comprising:
   identifying a plurality of low cost links including the low cost link of the TCP subflows of the MPTCP connection; and
   selecting the low cost link from the plurality of low cost links for transmitting the data packet based on network throughput requirements of a scheduler associated with the MPTCP connection.

4. The method of claim 1, further comprising:
   identifying that the low cost link and the high cost link do not exist in the MPTCP connection; and
   sending the data packet over a backup link of the MPTCP connection.

5. The method of claim 1, wherein the TCP congestion control mechanism is a loss sensitive control mechanism that controls congestion in the MPTCP connection based on packet loss.

6. The method of claim 5, further comprising:
   determining, based on an amount of space in a packet congestion window associated with the low cost link, as indicated by the feedback from the TCP congestion control mechanism, whether to send the data packet over the low cost link as part of the MPTCP connection; and
   sending the data packet over the low cost link if it is determined to send the data packet over the low cost link based on the amount of space in the packet congestion window associated with the low cost link.

7. The method of claim 1, wherein the TCP congestion control mechanism is a loss insensitive congestion control mechanism that controls congestion in the MPTCP connection based on actual congestion in the MPTCP connection.

8. The method of claim 7, wherein the TCP congestion control mechanism is a bottleneck bandwidth and round-trip propagation time (RTT) (BBR) congestion control mechanism.

9. The method of claim 7, further comprising:
   determining, based on a RTT and a pacing gain associated with the low cost link, as indicated by the feedback from the TCP congestion control mechanism, whether to send the data packet over the low cost link as part of the MPTCP connection; and
   sending the data packet over the low cost link if it is determined to send the data packet over the low cost link based on the RTT and the pacing gain associated with the low cost link.

10. The method of claim 9, further comprising:
    identifying whether the low cost link is in a drain mode based on the pacing gain associated with the low cost link; and
    determining that the low cost link is unsuitable for transmitting the data packet through the MPTCP connection if the low cost link is operating in the drain mode.

11. The method of claim 7, further comprising:
    identifying a bandwidth cap rate for transmitting data, including the data packet, through the TCP subflows over the multipath TCP connection;
    determining whether to send the data packet in the MPTCP connection over the low cost link based on the bandwidth cap rate and the congestion level on the low cost link; and
    sending the data packet over the low cost link if it is determined to send the data packet over the low cost link based on the bandwidth cap rate and the congestion level on the low cost link.

12. The method of claim 11, further comprising sending the data packet over the high cost link if it is determined to refrain from sending the data packet over the low cost link based on the bandwidth cap rate and the congestion level on the low cost link, wherein the data packet is sent over the high cost link at a pacing rate set to a bandwidth difference between the congestion level on the low cost link and the bandwidth cap rate.

13. The method of claim 12, wherein the high cost link is selected from a plurality of high cost links of the TCP subflows of the MPTCP based on the bandwidth cap rate.

14. A system comprising:
    one or more processors; and
    at least one computer-readable storage medium having stored therein instructions which, when executed by the one or more processors, cause the one or more processors to perform operations comprising:
    identifying a low cost link and a high cost link of transmission control protocol (TCP) subflows of a multipath TCP (MPTCP) connection formed between a first MPTCP peer and a second MPTCP peer based on an exchange of information between the first MPTCP peer and the second MPTCP peer to tag the high cost link as a cost link;
    determining a congestion level on the low cost link based on feedback from a TCP congestion control mechanism for the MPTCP connection;
    determining whether to send a data packet in the MPTCP connection over the low cost link or the high cost link based on the congestion level on the low cost link and a lower cost of the low cost link compared to a cost of the high cost link;

sending the data packet over the low cost link as part of the MPTCP connection if it is determined to send the data packet over the low cost link; and sending the data packet over the high cost link instead of the low cost link if it is determined to send the data packet over the high cost link based on the congestion level on the low cost link and the lower cost of the low cost link compared to the cost of the high cost link.

15. The system of claim 14, wherein the TCP congestion control mechanism is a loss sensitive control mechanism that controls congestion in the MPTCP connection based on packet loss.

16. The system of claim 15, wherein the instructions which, when executed by the one or more processors, further cause the one or more processors to perform operations comprising:

determining, based on an amount of space in a packet congestion window associated with the low cost link, as indicated by the feedback from the TCP congestion control mechanism, whether to send the data packet over the low cost link as part of the MPTCP connection; and sending the data packet over the low cost link if it is determined to send the data packet over the low cost link based on the amount of space in the packet congestion window associated with the low cost link.

17. The system of claim 14, wherein the TCP congestion control mechanism is a loss insensitive congestion control mechanism that controls congestion in the MPTCP connection based on actual congestion in the MPTCP connection and the instructions which, when executed by the one or more processors, further cause the one or more processors to perform operations comprising:

determining, based on a RTT and a pacing gain associated with the low cost link, as indicated by the feedback from the TCP congestion control mechanism, whether to send the data packet over the low cost link as part of the MPTCP connection; and sending the data packet over the low cost link if it is determined to send the data packet over the low cost link based on the RTT and the pacing gain associated with the low cost link.

18. The system of claim 17, wherein the instructions which, when executed by the one or more processors, further cause the one or more processors to perform operations comprising:

identifying a bandwidth cap rate for transmitting data, including the data packet, through the TCP subflows over the multipath TCP connection;

determining whether to send the data packet in the MPTCP connection over the low cost link based on the bandwidth cap rate and the congestion level on the low cost link; and sending the data packet over the low cost link if it is determined to send the data packet over the low cost link based on the bandwidth cap rate and the congestion level on the low cost link.

19. A non-transitory computer-readable storage medium having stored therein instructions which, when executed by a processor, cause the processor to perform operations comprising:

identifying a low cost link and a high cost link of transmission control protocol (TCP) subflows of a multipath TCP (MPTCP) connection formed between a first MPTCP peer and a second MPTCP peer based on an exchange of information between the first MPTCP peer and the second MPTCP peer to tag the high cost link as a cost link;

determining a congestion level on the low cost link based on feedback from a TCP congestion control mechanism for the MPTCP connection; and sending a data packet over the low cost link as part of the MPTCP connection if it is determined to send the data packet over the low cost link based on the congestion level on the low cost link and a lower cost of the low cost link compared to a cost of the high cost link.

20. The system of claim 14, wherein the instructions which, when executed by the one or more processors, further cause the one or more processors to perform operations comprising sending the data packet over the high cost link instead of the low cost link if it is determined to send the data packet over the high cost link based on the congestion level on the low cost link.

* * * * *